US011765152B2

(12) United States Patent
Obando Chacon et al.

(10) Patent No.: US 11,765,152 B2
(45) Date of Patent: Sep. 19, 2023

(54) RELATED ASSET ACCESS BASED ON PROVEN PRIMARY ASSET ACCESS

(71) Applicant: Microsoft Technology Licensing, LLC, Redmond, WA (US)

(72) Inventors: German David Obando Chacon, Kirkland, WA (US); Jonathan Daniel Keech, Kirkland, WA (US); Mark Alistair Wilson-Thomas, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 16/522,466

(22) Filed: Jul. 25, 2019

(65) Prior Publication Data

US 2021/0029108 A1 Jan. 28, 2021

(51) Int. Cl.
*H04L 9/40* (2022.01)
*H04L 41/16* (2022.01)

(52) U.S. Cl.
CPC .......... *H04L 63/0815* (2013.01); *H04L 41/16* (2013.01); *H04L 63/102* (2013.01); *H04L 63/168* (2013.01); *H04L 63/20* (2013.01)

(58) Field of Classification Search
CPC ... H04L 63/0815; H04L 41/16; H04L 63/102; H04L 63/168
See application file for complete search history.

(56) References Cited

U.S. PATENT DOCUMENTS

| 6,757,893 B1 * | 6/2004 | Haikin | G06F 8/71 717/170 |
| 7,568,218 B2 * | 7/2009 | Garg | H04L 63/0815 713/182 |
| 8,209,259 B2 * | 6/2012 | Graham, Jr | G06Q 10/10 705/50 |
| 8,789,188 B2 | 7/2014 | Habeck et al. | |

(Continued)

OTHER PUBLICATIONS

Chamarty, et al., "An Authorization Scheme for Version Control Systems", In Proceedings of the 16th ACM Symposium on Access Control Models and Technologies, Jun. 15, 2011, pp. 123-132.

(Continued)

*Primary Examiner* — Jason Chiang
(74) *Attorney, Agent, or Firm* — Ogilvie Law Firm

(57) ABSTRACT

Access control enhancements reduce security risks and management burdens when a user with access to a primary asset seeks access to a related supplementary asset. When a sufficient proof of access to the primary asset is provided, and the relationship of the primary and supplementary assets is recognized, access to the supplementary asset is granted without requiring a separate sign-in, a permission query to the supplementary asset's owner, or an authorization through an authenticated identity of the requestor, for example. Automatic access to the supplementary asset can be granted without the security risks inherent in a file share or a share link. In particular, a developer with access to one component of a project can be automatically and conveniently granted access to the rest of the project. Likewise, a custom machine learning model for autocompletion (Continued)

becomes accessible to all developers working on the repository source used to train the model.

20 Claims, 10 Drawing Sheets

(56) References Cited

U.S. PATENT DOCUMENTS

| | | | |
|---|---|---|---|
| 8,869,097 B2 | 10/2014 | Asadullah et al. | |
| 9,009,795 B2 | 4/2015 | Failelson et al. | |
| 10,747,461 B1* | 8/2020 | Donohue | G06F 3/0647 |
| 2002/0038296 A1* | 3/2002 | Margolus | G06Q 20/206 |
| 2002/0169781 A1 | 11/2002 | Poole et al. | |
| 2005/0246666 A1* | 11/2005 | Kalinoski | G06Q 10/0631 717/100 |
| 2006/0101443 A1* | 5/2006 | Nasr | G06F 8/71 717/163 |
| 2006/0184608 A1 | 8/2006 | Williams et al. | |
| 2007/0130183 A1* | 6/2007 | Morris | G06F 16/284 |
| 2010/0293523 A1* | 11/2010 | Ahadian | G06F 8/10 717/108 |
| 2011/0066968 A1* | 3/2011 | Goldsmith | G06F 16/954 715/781 |
| 2011/0282873 A1* | 11/2011 | Mirus | G06F 16/954 707/737 |
| 2013/0007700 A1 | 1/2013 | Villar et al. | |
| 2015/0135166 A1 | 5/2015 | Tarlow et al. | |
| 2015/0371016 A1* | 12/2015 | Nielsen | G06F 21/6218 726/27 |
| 2016/0036872 A1* | 2/2016 | Lappin | H04L 51/32 709/204 |
| 2016/0156740 A1* | 6/2016 | Hamilton, II | H04L 67/06 709/219 |
| 2016/0188301 A1* | 6/2016 | Zang | G06F 8/33 717/113 |
| 2016/0267413 A1* | 9/2016 | Liang | G06F 21/604 |
| 2018/0060044 A1 | 3/2018 | Hao et al. | |
| 2018/0276104 A1 | 9/2018 | Calla et al. | |
| 2019/0146783 A1 | 5/2019 | Ginchereau et al. | |
| 2019/0156702 A1 | 5/2019 | Sannidhanam et al. | |
| 2019/0318113 A1* | 10/2019 | Cortes Rossello | G06F 16/2443 |
| 2019/0324727 A1* | 10/2019 | Carranza | G06F 11/3604 |
| 2020/0272992 A1* | 8/2020 | Hojer | G06F 3/0482 |

OTHER PUBLICATIONS

Hengartner, et al., "Exploiting Information Relationships for Access Control in Pervasive Computing", In Journal of Pervasive and Mobile Computing, vol. 2, Issue 3, Sep. 2006, pp. 344-367.
"International Search Report and Written Opinion Issued in PCT Application No. PCT/US20/036864", dated Sep. 17, 2020, 12 Pages.
Xu, et al., "Enforcing Access Control in Distributed Version Control Systems", In Proceedings of the IEEE International Conference on Multimedia and Expo, Jul. 8, 2019, pp. 772-777.
"Authenticate access with personal access tokens", retrieved from <<https://docs.microsoft.com/en-us/azure/devops/organizations/accounts/use-personal-access-tokens-to-authenticate?view=azure-devops», Jun. 13, 2019, 10 pages.
"What is HEAD in git?", retrieved from <<http://researchhubs.com/post/computing/git/what-is-HEAD-in-git.html>>, copyright 2015, 3 pages.
"2.5 Git Basics—Working with Remotes", retrieved from <<https://git-scm.com/book/en/v2/Git-Basics-Working-with-Remotes>>, no later than Jul. 18, 2019, 9 pages.
Mohamed Radwan, "What's new in Visual Studio IntelliCode", retrieved from <<https://mohamedradwan.com/2019/01/13/whats-new-in-visual-studio-intellicode/>>, Jan. 13, 2019, 9 pages.
Mohamed Radwan, "Build a CI/CD (Continuous Integration/ Continuous Deployment) Pipeline from Visual Studio", retrieved from <<https://mohamedradwan.com/2018/06/05/build-a-cicd-continuous-integrationcontinuous-deployment-pipeline-from-visual-studio/>>, Jun. 5, 2018, 17 pages.
Chris Simpkins, "How to Keep a Downstream git Repository Current with Upstream Repository Changes", retrieved from <<https://medium.com/sweetmeat/how-to-keep-a-downstream-git-repository-current-with-upstream-repository-changes-10b76fad6d97>>, Oct. 9, 2017, 4 pages.
"Intelligent code completion", retrieved from <<https://en.wikipedia.org/wiki/Intelligent_code_completion>>, Feb. 7, 2019, 5 pages.
"Autocomplete", retrieved from <<https://en.wikipedia.org/wiki/Autocomplete>>, Jul. 11, 2019, 10 pages.
"Integrated development environment", retrieved from <<https://en.wikipedia.org/wiki/Integrated_development_environment>>, Jun. 27, 2019, 6 pages.
"Microsoft Visual Studio", retrieved from <<https://en.wikipedia.org/wiki/Microsoft_Visual_Studio>>, Jul. 18, 2019, 14 pages.
"Authorization", retrieved from <<https://en.wikipedia.org/wiki/Authorization>>, May 29, 2019, 3 pages.
"Software repository", retrieved from <<https://en.wikipedia.org/wiki/Software_repository>>, Jul. 10, 2019, 5 pages.
"Machine learning", retrieved from <<https://en.wikipedia.org/wiki/Machine_learning>>, Jul. 18, 2019, 20 pages.
"Hash function", retrieved from <<https://en.wikipedia.org/wiki/Hash_function>>, Jul. 16, 2019, 7 pages.
"Zero-knowledge proof", retrieved from <<https://en.wikipedia.org/wiki/Zero-knowledge_proof>>, Jul. 18, 2019, 9 pages.
Jesus Rodriguez, "Facebook Uses Machine Learning to Help Developers Write Code Faster", retrieved from <<https://towardsdatascience.com/facebook-uses-machine-learning-to-help-developers-write-code-faster-577f38008847>>, Apr. 18, 2019, 8 pages.
"Gerrit Code Review—Access Controls", retrieved from <<https://gerrit-review.googlesource.com/Documentation/access-control.html>>, no later than Jul. 18, 2019, 41 pages.
"Visual Studio IntelliCode: AI-assisted development", retrieved from <<https://web.archive.org/web/20190603153343/https:/visualstudio.microsoft.com/services/intellicode/>>, Jun. 3, 2019, 7 pages.
"An open source Git extension for versioning large files", retrieved from <<https://git-lfs.github.com/>>, no later than Jul. 19, 2019, 4 pages.
"Access token", retrieved from <<https://en.wikipedia.org/wiki/Access_token>>, Jul. 3, 2019, 3 pages.

* cited by examiner

SOME EXAMPLES 700 OF ASSET RELATIONSHIPS 212

COMPUTATIONAL DERIVATION RELATIONSHIP 702:
ONE ASSET WAS COMPUTATIONALLY DERIVED
FROM ANOTHER ASSET

SHARED PROJECT RELATIONSHIP 704:
EACH ASSET BELONGS TO THE SAME BUILD PROJECT

REPOSITORY ASSET RELATIONSHIP 706:
ONE ASSET IS IN A SOFTWARE REPOSITORY AND
ANOTHER ASSET HAS AN APPLICABLE DEVELOPMENT ITEM

VERSION CONTROL RELATIONSHIP 708:
ONE ASSET IS IN VERSION-CONTROLLED SOURCE AND
ANOTHER ASSET HAS AN APPLICABLE DEVELOPMENT ITEM

DEPENDENCY RELATIONSHIP 710:
ONE ASSET HAS A BUILD OR RUNTIME DEPENDENCY 712 ON
ANOTHER ASSET

LARGE FILE RELATIONSHIP 714:
ONE ASSET IS STORED IN STORAGE 716 FOR LARGE FILES AND
ANOTHER ASSET REFERS TO THAT LARGE FILE ASSET

MODEL TRAINING RELATIONSHIP 718:
ONE ASSET IS A TRAINED MACHINE LEARNING MODEL AND
ANOTHER ASSET HAS DATA USED FOR TRAINING THE MODEL

Fig. 7

SOME EXAMPLES 800 OF SHARING MECHANISMS 802

SHARE LINK 804 | FILE SHARE 806 | ACCESS TOKEN 808

SEPARATE SIGN-ON 810 SPECIFICALLY FOR ASSET ACCESS

INTERACTIVE PERMISSION GRANT 812 | OTHER 814

Fig. 8

RELATED ASSET ACCESS BASED ON PROVEN PRIMARY ASSET ACCESS

BACKGROUND

Noon Attacks on computing systems take many different forms, including some forms which are difficult to predict, and forms which may vary from one situation to another. Accordingly, a guiding principle of cybersecurity is "defense in depth". In practice, defense in depth is often pursued by forcing attackers to encounter multiple different kinds of security mechanisms at multiple different locations around or within a computing system. No single security mechanism is able to detect every kind of cyberattack, or able to end every detected attack. But sometimes combining and layering a sufficient number and sufficient variety of defenses will deter an attacker, or will at least limit the scope of the harm caused by an attack.

However, even when accurate and current data are available for use in assessing potential or existing defenses, many choices remain to be made when trying to help secure a particular computing system. Different cybersecurity efforts often have different costs and benefits, which may vary between systems and may be judged differently by different people. Defenses that are considered effective in protecting one system against its attackers will not necessarily work as desired to protect a different system. Attackers continually change their tactics, techniques, and procedures, and cybersecurity professionals may pursue various preventive and reactive measures in turn. Cybersecurity defenses also impose costs, including computational resource costs like memory and processor cycles and network bandwidth, and human costs in administrative time and user time and decreases in the perceived or actual usability of information processing systems and services. Balancing costs and benefits is important, but difficult.

SUMMARY

Embodiments described in this document provide improved system and service usability while avoiding certain security risks and reducing certain management burdens in particular situations, namely, situations in which a user already has access to a primary digital asset and desires access to a related supplementary digital asset. "Access" to an asset includes a permission or capability to read, modify, write, or otherwise utilize an asset. When a sufficient proof of access to the primary asset is provided, and the relationship of the primary and supplementary assets is a recognized one, then access to the supplementary asset is granted without requiring a separate sign-in, or a permission query to the supplementary asset's owner or administrator, or an authorization check against an authenticated identity of the requestor, or another burdensome operation. This innovative approach improves usability by facilitating automatic access to the supplementary asset without increasing security risk in the way that, e.g., employing a file share or a share link to make the supplementary asset accessible would increase risk.

In some embodiments, an access controller receives a request by a requestor for access to a supplementary asset. The access controller determines whether the supplementary asset is related to a primary asset in a recognized way, and verifies whether the requestor has access to the primary asset. When a verification result of the verifying indicates the requestor has access to the primary asset, then the access controller grants the requestor access to the supplementary asset based on a determination result of the determining and on the verification result. However, when the verification result of the verifying does not indicate the requestor has access to the primary asset, then the access controller denies the requestor access to the supplementary asset based on at least the verification result; the access request may also be denied when the determination result indicates that a recognized relationship between the supplementary asset and some primary asset has not been found.

In some embodiments, the determining produces at least one of the following determination results, thereby representing a recognized relationship between the supplementary asset and the primary asset: at least a portion of one of the assets was computationally derived from at least a portion of the other asset; each asset belongs to the same software artifact build project; one of the assets is repository-resident and the other asset includes a development tool or artifact that is applicable to at least a portion of the repository-resident asset; one of the assets includes source code resident in a version control system and the other asset includes a development tool or artifact that is applicable to at least a portion of the source code; one of the assets includes a build dependency of the other asset or a runtime dependency of the other asset or both; one of the assets includes data stored in a system configured for large file storage and the other asset includes a text pointer or other reference to that data; or one of the assets includes a machine learning model which was trained at least in part using at least a portion of the other asset.

Thus, in some embodiments the requestor is granted access to the supplementary asset or the requestor is denied access to the supplementary asset, without imposing certain management burdens or running certain risks, or both. For example, the embodiment may reduce burdens and risks by not interactively seeking a supplementary asset access permission on behalf of the requestor from an administrator or an owner of the supplementary access, or the embodiment may provide an increase in available access to the supplementary asset without conditioning the increase on any identity of the requestor. Some embodiments grant the requestor access to the supplementary asset without conditioning that access on supplementary-asset-specific operations performed using a share link, or a file share, or another explicit sharing management mechanism, which pose certain risks and also impose management burdens. Some embodiments grant the requestor access to the supplementary asset without conditioning that access on a burdensome supplementary sign-in that is specifically performed to gain access to the supplementary asset.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 7 is a block diagram illustrating some examples of asset relationships;

FIG. 8 is a block diagram illustrating some examples of sharing mechanisms which may provide access to assets;

DETAILED DESCRIPTION

Overview

Figure 1:
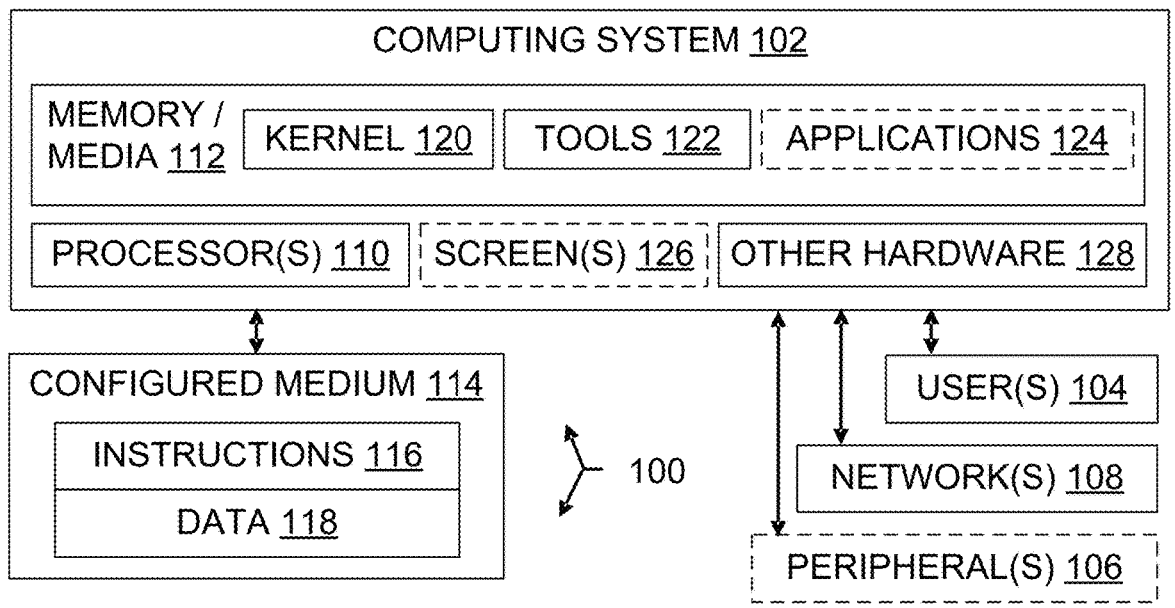
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges of improving the usability of an autocompletion tool. In particular, a challenge was to how to securely yet conveniently share custom autocompletion machine learning models among members of a software development team. However, one of skill will recognize that the teachings provided herein have beneficial applicability to many other technical scenarios as well.

Software developers have benefited for many years from IntelliSense® autocompletion technology. As a developer types source code into an editor that is equipped with IntelliSense® technology, the developer is offered possible completions of identifiers. This allows faster and more accurate creation of source code.

More recently, IntelliCode™ technology offers artificial intelligence-enabled autocompletion assistance with software development. Within a Visual Studio® development environment, Visual Studio IntelliCode™ technology uses machine learning and other techniques to learn from source code to spot irregular patterns, missed refactorings, and other opportunities for improving the code that is being developed. "Autocompletion" is used very broadly herein to include not only suggestions for completing partially entered identifiers, but also to include any other software-generated suggestions for altering source code or altering another digital artifact.

IntelliSense®, IntelliCode™ Visual Studio IntelliCode™ and Visual Studio® are marks of Microsoft Corporation.

Some systems equipped with IntelliCode™ technology can produce custom models on solutions, when a user opens a Visual Studio® tool and makes a suitable gesture in the tool's user interface. (A "solution" in this sense typically includes source code and other digital artifacts; it may also be referred to in some scenarios by some people as a "project" or a "build" or a development "target"). The generated model is associated to the user account that triggered the model training, and normally only that user account can use the model. In order to have other team members consume a model for the same solution, the model owner would conventionally have to provide each individual team member with a share link, or each individual team member would have to train a model from the same solution themselves, or some other similar action would be required. These are burdensome management actions which take time and energy that could have been spent instead on development efforts such as writing or debugging code.

Also, providing team members with access to the model through a share link is risky. Share links can be passed around outside the sphere of authorized access to the code under development, and thus are not considered secure.

Additionally, once the model becomes stale (e.g., the source code from which the model was derived has changed sufficiently to make the model's prediction less helpful than desired), the owner of the model would conventionally manually trigger a re-train for the model to be refreshed. This is inconvenient, because users don't necessarily think much about the creation, lifetime, and maintenance of their IntelliCode™ models. Nor should they have to; they should be able to focus instead on designing, writing, debugging, testing, and documenting the solution code that is under development.

Teachings described herein may be applied to produce an improved IntelliCode™ system or service that would allow anyone who has provable access to a repository to benefit from models already generated for a solution in the repository. New team members, for example, could clone a repository, open a solution, and shortly thereafter conveniently enjoy the productivity benefits of using IntelliCode™ custom model suggestions that are provided to them through a model that was pre-trained for this solution. This pre-training could be done by the team member's continuous integration toolchain, or by another user who has access to the repository. No share link, independent model regeneration, separate sign-in to a special models account, or similar burden or risk would be required.

Thus, in some embodiments taught herein IntelliCode™ technology will provide models that are attached to a solution in a repository, not to a particular user or particular user account. The model can be consumed and retrained by anyone who can prove to the IntelliCode™ technology that they have access to the solution in the repository. Various methods are described herein by which a team member or a continuous integration agent or other user can give this proof-of-access to the IntelliCode™ technology. Various asset relationships, other than the motivating example of a <trained autocompletion model> asset and a <solution code used to train the model> asset, are also discussed herein.

Some embodiments described herein may be viewed by some people in a broader context. For instance, concepts such as access, burdens, control, proof, relationships, and requests, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to conveniently and securely provide access to a digital asset when access to a related digital asset has already been given. Other configured storage media, systems, and processes involving access, burdens, control, proof, relationships, or requests are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, requests, responses, URLs, operating systems, software development environments, programming languages, software processes, development tools, identifiers, files, data structures, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a requestor device and other devices in a computer network, access control which facilitates software development, or automatic enforcement of security policies to control access to digital data, which are each activities deeply rooted in computing technology. Some of the technical mechanisms discussed include, e.g., hashes, web service interfaces, continuous integration agents, configured processors, repositories, version control systems generally, and trained machine learning models. Some of the technical effects discussed include, e.g., access grants or denials without reliance on requestor identity, avoidance of interactive permission queries, secure and convenient access to assets without reliance on share links or file shares, and automatic retraining of custom models. Thus, purely mental processes are clearly excluded. Some embodiments improve the functioning of computing systems and services by avoiding specified security risks (e.g., share links, file shares) and reducing specified management burdens (e.g., separate sign-on, redundant model or other asset generation) when a user already has access to a primary digital asset and desires access to a related supplementary digital asset. Other advantages based on the technical characteristics of the teachings will also be apparent to one of skill from the description provided.

Note Regarding Hyperlinks

This disclosure may contain various URIs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HEAD: a reference to the last commit in the currently check-out branch;
this term used in discussing git repositories; although it is often capitalized, it is not an acronym
HTTP: hypertext transfer protocol
HTTPS: hypertext transfer protocol secure
IaaS or IAAS: infrastructure-as-a-service
ID: identification or identity
IDE: integrated development environment
IoT: internet of things
IP: internet protocol
LAN: local area network
OS: operating system
PaaS or PAAS: platform-as-a-service
RAM: random access memory
ROM: read only memory
SHA: secure hash algorithm
UEFI: Unified Extensible Firmware Interface
URI: uniform resource identifier
URL: uniform resource locator
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Access control operations such as issuing a request for access to a digital asset, verifying proof of access to a digital asset, determining a relationship between digital assets, automatically granting or denying an access request, and many other operations discussed herein, are understood to be inherently digital. A human mind cannot interface directly with a CPU or other processor, or with RAM or other digital storage, to read and write the necessary data to perform the access control steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, associating, building, comparing, computing, conditioning, controlling, denying, deriving, depending, determining, finding, generating, granting, performing, proving, receiving, requesting, residing, sending, setting, sharing, signing in, training, using, verifying (and accesses, accessed, associates, associated, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

Figure 6:
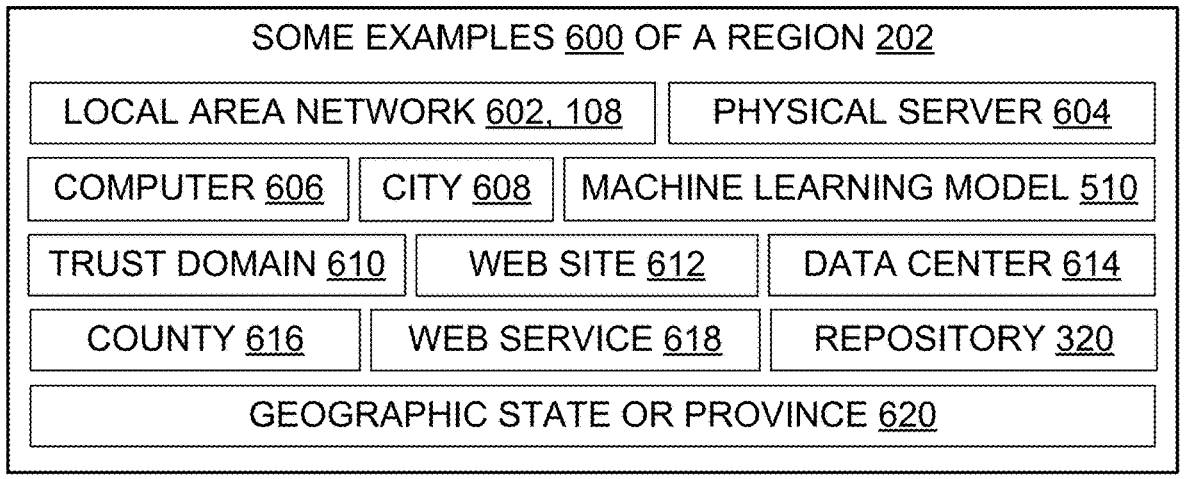
FIG. 6 is a block diagram illustrating some examples of ways to define regions.

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites, hardware development tools and tool suites, diagnostics, and so on
124 applications, e.g., word processors, web browsers, spreadsheets, games, email tools
126 display screens, also referred to as "displays"
128 computing hardware not otherwise associated with a reference number 106, 108, 110, 112, 114
200 requestor, e.g., person or account or agent or device that requests access to an asset
202 region; see FIG. 6 for examples
204 software development tool, e.g., integrated development environment, autocompletion tool; software development tools 204 are some examples of tools 122
206 primary digital asset; the qualifier "primary" is used for convenience to indicate that this is the asset to which a requestor already has access (or is asserted to already have access), as opposed to a supplementary asset to which access is sought; a given asset or given kind of asset may be primary in one situation and supplementary in a different situation
208 request for access to a supplementary asset, e.g., a request message or request data structure; numeral 208 may also refer to an act of requesting access to a supplementary asset
210 access controller
212 relationship between assets; "unknown" and "not yet determined" are implicitly or explicitly among the relationships used in a given embodiment; a relationship may also be referred to as a "relation"
214 relationship checker, namely, software or hardware or both which in operation attempts to determine what relationships exist between two assets
216 access, e.g., access to a primary asset, also referred to as "primary access", or access to a supplementary asset, also referred to as "supplementary access" or "derived access"; access 216 also refers to an act of accessing, e.g., by creating, reading, writing, modifying, deleting or otherwise utilizing content of an asset
218 primary access checker, namely, software or hardware or both which in operation attempts to determine whether a request has adequate proof of access to a primary asset
220 supplementary digital asset; the qualifier "supplementary" is used for convenience to indicate that this is the asset to which access is sought, as opposed to a primary asset to which a requestor already has access (or is asserted to already have access); a given asset or given kind of asset may be primary in one situation and supplementary in a different situation
300 aspect of a computing environment
302 cloud; may also be referred to as "cloud computing environment"
304 integrated development environment (IDE)
306 virtual machine, e.g., a computing construct which provides hardware virtualization and includes an operating system 308 container, e.g., a computing construct which provides user space virtualization and does not itself include an operating system but is nonetheless reliant upon an operating system to execute 310 digital artifact generally, e.g., any item stored digitally or transmitted digitally or processed digitally which has its own name, own address, or existence as a distinguishable unit in a computing system 312 commit point in a repository or other version control system; may also be referred to as a "commit"

314 web service 316 version of a digital artifact 318 version control system 320 software repository; some of the most widely used web-based repositories, which provide services for source code and development project hosting, include GitHub® (mark of GitHub, Inc.), BitBucket® (mark of Atlassian Pty Ltd), and SourceForge® (mark of SourceForge Media, LLC), but many other kinds of repository also exist, and many individual repositories and repository services may be created after the filing of the present disclosure 404 proof of access to an asset 406 response to a request 208

408 a grant of access; also refers to the act of granting access 410 a denial of access; also refers to the act of denying access 412 result of a computation; may also be referred to as a result of processing or as a result of a step performed by an embodiment 414 result 412 of a relationship determining step; a determination that a recognized relation 212 exists between assets; determination 414 may be implemented as a data structure or may be implicit in a code execution path 416 result 412 of an access verifying step; a verification that a primary asset has been or could be accessed (legitimacy of the underlying primary asset access is assumed at the verifying step—authentication and authorization of access to a primary asset is not an obligation of primary access checker 218); verification 416 may be implemented as a data structure or may be implicit in a code execution path 418 mapper code which creates, updates, or traverses a mapping between versioned assets; 418 also refers to a mapping action 420 protocol, e.g., a zero-knowledge protocol or a challenge-response protocol 422 user interface; may include one or more of a command line interface, a graphical user interface (GUI), an application program interface (API), or a web service interface, for example 500 example of digital artifact 502 database 504 source code 506 code generally, e.g., source code, executable code 508 file 510 machine learning model (at least partially trained)

512 data used in training or testing a machine learning model 514 component of a build, e.g., source code to compile as part of building the build, object code to link as part of building the build, resources such as image files or sound files to reference as part of building the build, makefiles or other building operations files to follow as part of building the build, or other artifacts relied on as part of building the build 516 build project; may refer to a makefile or other building operation files to follow as part of building a project's output (a.k.a., a "build"), or may refer to the project's output 518 toolchain, e.g., a set of tools configured to perform successive stages of software development, e.g., to perform continuous integration or continuous deployment or a portion thereof such as compiling, linking, launching, and automatically testing software 600 examples of a region, that is, examples of ways to define region boundaries 602 local area network; this is also an example of networks 108 generally 604 physical server; this is also an example of physical hardware of a server, which is a computer system 102; the physical server boundary is defined by physical items such as receptacles for network and power connections, a housing, and physical components such as processor chips and memory chips 606 computer; a physical server, workstation, laptop, smartphone, and tablet are each an example of a computer 606; a computer 606 is a single machine, whereas a computing system 102 includes one or more computers 608 city; the boundary is defined by laws or regulations and usually shown on maps 610 trust domain, e.g., domain administered by an Active Directory® domain controller or other domain controller (mark of Microsoft Corporation)

612 web site; the boundary extends to all IP addresses reachable through a specified domain name 614 data center; the boundary extends to all servers and other computing systems located on a given data center campus, which may include one or more buildings 616 county; the boundary is defined by laws or regulations and usually shown on maps 618 web service; the boundary extends to all APIs and computational or storage or network resources reachable through a specified service name or interface; may also be referred to as "web server"; includes hardware and software 620 state (e.g., California or Texas in the United States) or province (e.g., Quebec in Canada or Hokkaido in Japan); the boundary is defined by laws or regulations and usually shown on maps 700 examples of recognized asset relationships 702 computational derivation relationship, namely, one asset is computationally derived at least in part from at least part of another asset, e.g., one asset includes a machine learning model trained using data of the other asset, one asset includes an index into the other asset, one asset includes a compression or encryption or encoding or translation or hash of the other asset, one asset includes object code or executable code produced from source code of the other asset by a compiler or an assembler, or one asset includes output produced by inputting the other asset into a tool 122 or an application 124

704 shared project relationship, namely, both assets include a respective component of the same project 516

706 repository relationship: one asset resides in a repository 320 and the other asset includes content applicable to at least a portion of the repository-resident asset, e.g., a development tool applicable to the repository-resident asset, or a history of actions taken on the repository-resident asset 708 version control relationship: one asset resides in a version control system 318 (VCS) and the other asset includes content applicable to at least a portion of the VCS-resident asset, e.g., a development tool applicable to the VCS-resident asset, or a history of actions taken on the VCS-resident asset 710 dependency relationship: one asset has a build dependency or a runtime dependency on the other asset 712 dependency, e.g., a build dependency occurs when one asset is required in order to build another asset or required in order to build a project that has the other asset as a component, and a runtime dependency occurs when one asset is required in order to execute another asset with a processor 110

714 large file relationship: one asset references the other asset, e.g., by name or handle or GUID or pointer or other identifier, and the referenced asset resides in large file storage 716

716 file or block or other storage that is specifically designed to hold large items, e.g., git LFS (large file storage)

718 model training relationship: one asset includes a machine learning model trained using data of the other asset; this is an example of a computational derivation relation 702

800 example of sharing mechanism 802 sharing mechanism, namely, a mechanism for providing access to an asset 804 share link, e.g., a URL which points to an asset's location and allows access to an asset without requiring further authentication or authorization 806 file share, e.g., a link to a file or directory whose permissions allow access to an asset in the file or directory without requiring further authentication or authorization 808 access token, e.g., personal access token, security credential with user identity and privileges 810 sign-in, a.k.a. login; may also refer to act of logging in by entering authentication credentials; "sign-in" and "sign-on" and "login" and "log in" and "log on" and "logon" are used interchangeably 812 interactive permission grant 814 other sharing mechanism 900 access control flowchart; 900 also refers to access control methods illustrated by or consistent with the FIG. 9 flowchart, and to the access control actions of such a method 902 receive an access request 208 identifying a supplementary asset and providing an assertion of access to a primary asset 904 determine that a recognized relationship 212 exists between two assets 906 verify whether an assertion of access to a primary asset is sufficient proof of access to the primary asset 1000 repository commit diagram 1004 history of actions taken in a repository or other version control system 1006 metadata of a repository or other version control system 2000 flowchart; 2000 also refers to access control methods illustrated by or consistent with the FIG. 20 flowchart (which incorporates the steps of FIG. 9 and the steps of FIG. 22)

2002 perform access control steps or methods 2004 computationally derive at least part of one asset from at least part of another asset, thereby creating or modifying a computational derivation relation between the assets 2006 avoid conditioning supplementary asset access on the access controller having an identification of the access requestor 2008 condition supplementary asset access on the access controller having an identification of the access requestor, that is, access grant or denial depends on the access controller having an identification of the access requestor 2010 an identification of the access requestor, e.g., username, handle, GUID, or token 2012 generate an access request 208, e.g., populate an access request message or other data structure or invoke an access request API 2014 send a request or response over a network or through an API 2016 receive a request or response over a network or through an API 2018 configure a machine learning model for autocompletion, e.g., by initializing it, training it, or inserting it into a processing pipeline 2020 use a machine learning model for autocompletion, e.g., by receiving state data into the model and getting corresponding suggestions out of the model 2022 autocompletion functionality; also refers to an act of autocompletion 2024 use or perform a zero-knowledge protocol 2026 a zero-knowledge protocol, e.g., a protocol to establish access to repository source code or another primary asset without disclosing content of that asset; may be accomplished, e.g., by providing a hash which matches a previously provided and trusted hash, or a count of components of a certain kind, e.g., distinct identifiers containing at least three vowels, or the average length in bytes of the two smallest and two largest files, and so on 2028 find a secret 404 in the request 208

2030 avoid seeking permission interactively 2032 seek access permission interactively from a user or asset owner after an access request is received 902

2034 compute a distance from a commit point of interest in a model, e.g., the current working material's most recent commit point, and another commit point at which a model was trained 2036 distance between commit points 2038 avoid conditioning supplementary asset access on use of any sharing mechanism that is specific to the supplementary asset 2040 condition supplementary asset access on use of a sharing mechanism that is specific to the supplementary asset, such as a share link pointing to the supplementary asset or a file share containing the supplementary asset or a sign-in performed in addition to any sign-in that gave access to the primary asset 2042 compute a hash using a hash function 2044 compare two hashes to see if they have the same value 2046 hash value; also referred to simply as a "hash"

2048 associate versions of assets 206 or 220 with versions of asset access proofs 404

2050 avoid conditioning supplementary asset access on use of a sign-in performed in addition to any sign-in that gave access to the primary asset 2052 condition supplementary asset access on use of a sign-in performed in addition to any sign-in that gave access to the primary asset; such a sign-in is also referred to as a "supplementary sign-in"

2054 use a challenge-response protocol to establish access to repository source code or another primary asset 2056 a challenge-response protocol to establish access to repository source code or another primary asset; "challenge-response" refers to the back-and-forth (challenge followed by response to the challenge) nature of communications during performance of the protocol, so a zero-knowledge protocol, for example, may also be a challenge-response protocol 2058 any step discussed in the present disclosure that has not been assigned some other reference numeral 2200 flowchart; 2200 also refers to access control methods illustrated by or consistent with the FIG. 22 flowchart 2202 get a repository identifier 2204 repository identifier 2206 request a repository-attached model 2208 respond to a model request with a challenge 2210 challenge in a challenge-response protocol 2212 calculate a secret or other proof 404 or portion thereof 2214 match proof values to one another, e.g., find that two hash values are the same value 2216 download a model 2218 activate or otherwise use a model Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122, 304 which provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 8, some embodiments use or provide a functionality-enhanced system 210. The functionality enhancement promotes cybersecurity and usability by facilitating access to supplementary assets while reducing management burdens and avoiding some conventional risky approaches such as share links, file shares, separate sign-ins, and interactive permission queries.

For example, some embodiments ease the friction in developing code by making it easier to work on source code and other files 206 stored in a source repository (e.g., GitHub). With supplementary asset access control as taught, a developer can gain access to resources 220 related to an asset 206 under development, by proving that the developer has access to the asset. For example, if the developer (e.g., through an IDE) can show that the developer has access to a source code file 504 of a project 516, the developer can, without further logging on or providing other credentials, get access 216 to the rest of the files of the project.

Figure 2:
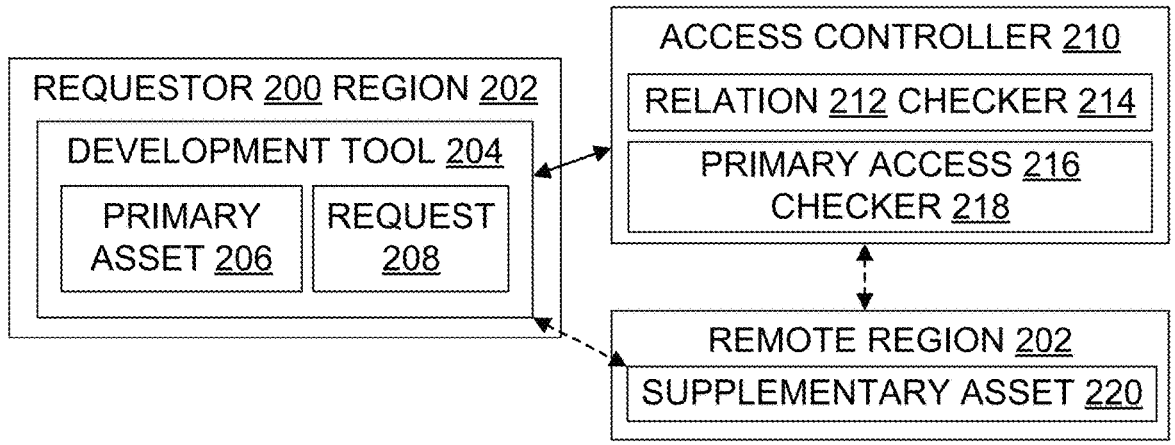
FIG. 2 is a block diagram illustrating an environment which includes an access requestor that has access to a primary asset, an access controller, and a supplementary asset.

As shown in the example of FIG. 2, a requestor 200 has access to a primary asset 206 and requests 208 access 216 to a related supplementary asset 220. The requestor 200 may be a user 104, a user account in use by a user, a software agent, or a device, for example. The request 208 may be generated automatically upon sign-in or upon the opening of a project, for example, or may be a result of a user selecting the supplementary asset from a menu or other list. The primary asset and the supplementary asset may both be local to the requestor, or they may reside in different regions 202.

In this example, the request 208 goes to an access controller 210 which grants or denies the requested access to the supplementary asset. If the request establishes that the requestor has access to the primary asset, and the access controller determines that the supplementary asset is in a relationship 212 to the primary asset that is recognized as a basis for supplementary asset access, then the access controller grants access 216. Otherwise, access 216 is denied. Determination of asset relationships is made by a relationship checker 214. Verification of access 216 to the primary asset is done by a primary access checker 218.

Asset relationships 212 or the lack thereof may be determined, e.g., by using one or more of the following: manifests that show a shared project relationship 704; project definitions that show a shared project relationship 704; makefiles that show a shared project relationship 704, a computational derivation relationship 702, or a dependency relationship 710; dependency graphs that show a dependency relationship 710; file naming conventions that show a computational derivation relationship 702 or a model training relationship 718; file location conventions that show a shared project relationship 704 or a large file relationship 714; log file entries that show any of the relationships 702-718; inclusion lists defining pairs or other tuples of related assets; exclusion lists defining assets which are not to be deemed suitably related for purposes of supplementary asset access; or other data structures or mechanisms. Relationships 212 are not limited in every embodiment to the specific examples 700 listed here.

Access to a primary asset may be verified, e.g., by providing in the request (or through the request, which is effectively in it) a secret that only an entity with access to the primary asset would have. The secret may be shared, or its possession may be proven even if it is not shared, using for example a challenge-response protocol or a zero-knowledge protocol. A copy of the secret may be placed in the request as a proof 404, to be compared by the primary access checker 218 with a copy of the secret previously entrusted to the access controller 210. For example, the secret may include a hash 2046 of a portion or all of the primary asset.

Figure 3:
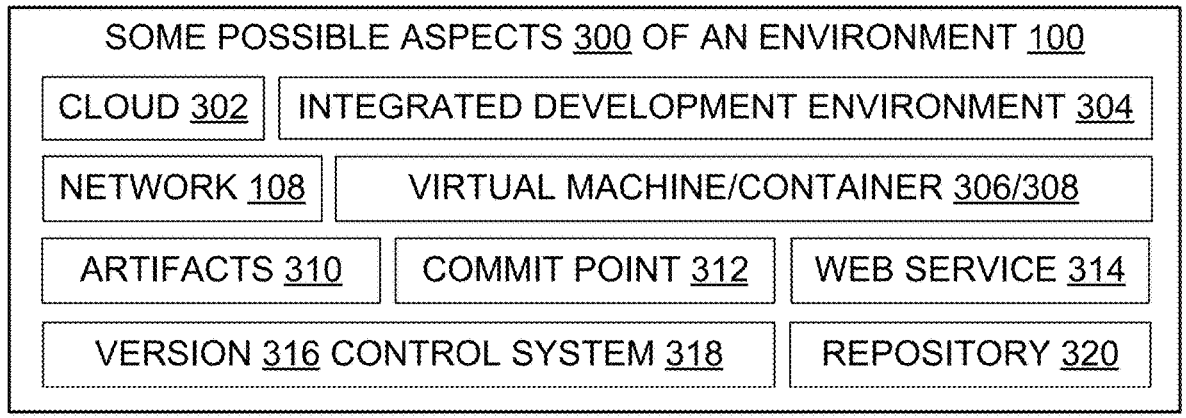
FIG. 3 is a block diagram illustrating some aspects of some computing environments.

FIG. 3 shows some additional aspects 300 of some environments 100, which are not necessarily mutually exclusive of each other. The illustrated aspects include a cloud 302, virtual machines 306 and containers 308, a network 108 generally, a web service 314, an integrated development environment 304, a repository 320, a version control system 318, commit points 312 in a repository 320 or version control system 318, and digital artifacts 310 generally.

Figure 4:
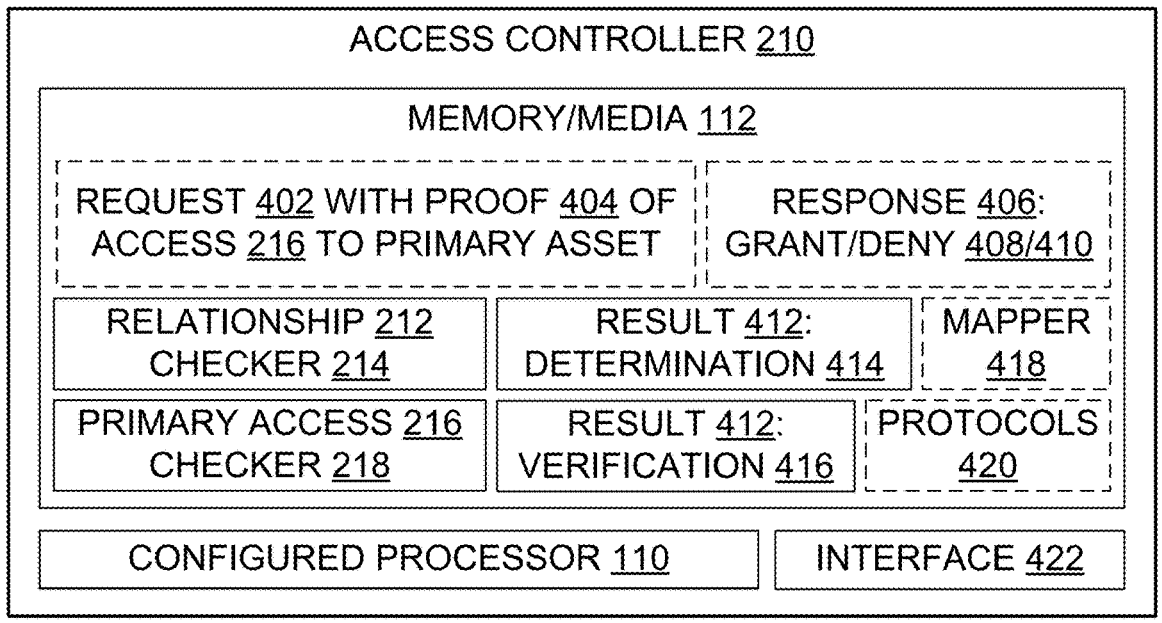
FIG. 4 is a block diagram illustrating aspects of a system which is configured with access controller functionality.

FIG. 4 further illustrates some embodiments of an access controller 210. As indicated by the dashed lines, a memory 112 in the access controller may contain a request 208 with an asserted proof 404 of access to a primary asset. The access controller memory may also contain a response 406 to the request, which may include an error message, tracking information, a checksum, and other supporting information, but is mainly of interest here to the extent it includes a grant 408 or a denial 410 of the request for supplementary asset access.

The illustrated access controller 210 includes a relationship checker 214 which produces a determination 414 as to any relevant relationships 212 between the primary asset and the supplementary asset. "No relationship sufficient for supplementary access" may also be treated as a relationship 212. The illustrated access controller 210 also includes a primary access checker 218 which produces a verification 416 as to whether the proof 404 of access to the primary asset is deemed sufficient. The relationship checker 214 may embody or invoke a mapper 418 when assets are versioned. When both primary and supplementary assets are versioned, an enhanced system may lock out future versions (thus effectively revoking access even in the absence of a mechanism for explicit revocation). The primary asset checker 218 may embody or invoke one or more protocols 420. Communications to and from the illustrated access controller 210 go through an interface 422 such as an API.

Figure 5:
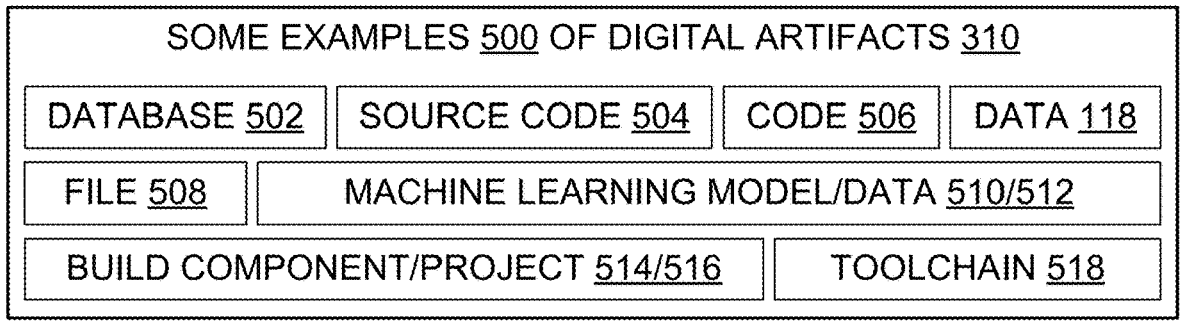
FIG. 5 is a block diagram illustrating some examples of digital artifacts.

FIG. 5 shows some examples 500 of some digital artifacts 310, which are not necessarily mutually exclusive of each other. The illustrated artifacts include a database 502, program source code 504, program code 506 generally, data 118 generally, files 508, machine learning models 510 and corresponding data 512, build components 514, build projects 516, and toolchains 518. These examples 500 help illustrate the broad applicability, across various assets, of the supplemental asset access control tools and techniques taught herein.

FIG. 6 shows some examples 600 of some regions 202, which are not necessarily mutually exclusive of each other, e.g., a city 608 may be part of a county 616 which is part of a state 620. Other illustrated regions include a local area network 602, a physical server machine 604, an individual computer 606, a machine learning model 510, a trust domain 610, a web site 612, a data center 614, a web service 618, and a repository 320. Regions 202 are of interest herein because different assets may reside in different regions, so region examples like these, which have well understood boundaries, can help illustrate that point. For example, two machine learning models 510 could be related 212 to each other, with one as a primary asset 206 and the other as a supplementary asset 220. In particular, and without ruling out other examples, one asset might be a less accurate but computationally faster model 510 that is used by default (one way of serving as the primary asset 206) while the other asset is a more accurate but also more computationally expensive model that must be expressly enabled (one way of serving as the supplementary asset 220). These model assets could be related, e.g., by both belonging to the same project 516.

FIG. 7 shows some examples 700 of asset relationships 212. A given embodiment may operate using one, some, or all of these examples 700, or using other relationships 212. The illustrated relationships 212 include computational derivation 702, shared project 704, repository-resident 706, version control system-resident 708, build or runtime dependency 710, large file 714, and model training 718 relationships 212.

FIG. 8 shows some examples 800 of some sharing mechanisms 802, which are not necessarily mutually exclusive of each other. These sharing mechanisms 802 are of interest herein because they are less desirable alternatives to innovative access control approaches taught herein. They are less desirable because they pose an increased (or at least avoidable) risk, or impose increased (or at least avoidable) management burdens, or both, so far as supplementary asset access is concerned. The illustrated sharing mechanisms include share links 804, file shares 806, access tokens 808, separate sign-ins 810, and interactive permission grants 812. They also include other 814 sharing mechanisms to the extent those other mechanisms 814 require extra asset owner or user work (a management burden) for supplementary asset access, beyond work already done to access the primary asset.

Some embodiments use or provide an access control system 210 which includes an access control memory 112 and an access control processor 110 in operable communication with the access control memory. The access control processor is configured to perform access control steps which include (a) receiving a request 208 by a requestor 200 for access to a supplementary asset 220, (b) determining that the supplementary asset 220 is related to a primary asset 206, (c) verifying that the request 208 identifies or contains a proof 404 of access to the primary asset, and (d) granting the access request based on a determination result 414 of the determining step and on a verification result 416 of the verifying step.

This example system 210 provides an increase in available access 216 to the supplementary asset without conditioning the increase on any identity of the requestor 200; requestor identity information if present need not be checked. What matters in this example is the relationship between the assets and the proof of access to the primary asset, as opposed to the permissions held by a particular requestor. Thus, an entity that gains improper access to the primary access will not have its identity checked again when it seeks access to the related supplementary asset.

By way of context for another example, in some cases of interest the primary asset 206 includes source code 504. Also, an artifact 310 may include a wide range of digital items, e.g., file, set of files, database, code, data, model, and so on. Also, computationally deriving assets may include creating machine learning models, database indexes, compressed or decompressed versions, encrypted or decrypted versions, encoded or decoded versions, sorted versions, cleaned versions, hashes, or any other processing result. Finally, a build component 514 may include dependent code, toolchain, large files, or anything else used to build the project 516. With this context in mind, for some access controller 210 embodiments the primary asset includes source code, and the supplementary asset includes at least one of the following: an artifact 310 which was computationally derived at least in part from the source code, or a build component 514 of a project in which the source code is also a build component.

In some embodiments, access controller 210 is further characterized in that the system of access controller 210 includes a requestor device 200 having a requestor device memory 112 and a requestor device processor 110. The requestor device is configured to generate, within an integrated development environment 304, the request 208 for access to the supplementary asset. One may view a requestor device as the source of the request in this example, because the request will come from a device regardless of whether the original source behind the request is that device, another device, a human, or software.

In some embodiments, access controller 210 is further characterized in that the system of access controller 210 includes an access controller web service interface 422, and the access controller receives the request 208 through the access controller web service interface.

In some embodiments, the primary asset 206 includes source code 504, the supplementary asset 220 includes a model 510 computationally derived at least in part from the source code, and the model is configured for use by an autocompletion tool 122. For example, the model 510 may be a custom model usable by an IntelliCode™ autocompletion tool (mark of Microsoft Corporation).

In general, a repository 320 is one example of a version control system (VCS) 318, but is not the only kind of VCS 318 one may use. VCSs in general, and repositories 320 in particular, track commit points 312, namely, points at which changes are committed. In less technical terms, commit points are like snapshots or milestones at different times in the history 1004 of changes to versioned artifacts. A commit point may have an associated model 510, which was trained using the version of source code (or other versioned artifact) that was committed at that commit point. In some embodiments, the primary asset 206 includes source code 504 in a version control system 318, with the source code including source code versions at a plurality of commit points 312 within the version control system. In some of these, the supplementary asset 220 includes an artifact 310 that was computationally derived at least in part from the source code version at a commit point.

Some embodiments connect assets of different systems together under a single authentication or authorization scheme. In effect, the authentication or authorization scheme protecting the primary asset 206 is automatically extended to the supplementary asset 220. For example, in some embodiments, the assets 206 and 220 reside in different respective regions 202 for at least one of the following definitions of a region: a local area network 602, a physical server 604, a computer 606, a data center 614, a trust domain 610, a web site 612, a web service 618, a repository 320, a machine learning model 510, a geographic city 608, a geographic county 616, a geographic state 620, or a geographic province 620. That is, the assets 206 and 220 may reside in different LANs 602, or in different web sites 612, or in different cities 608, for example.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific examples, component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

Figure 9:
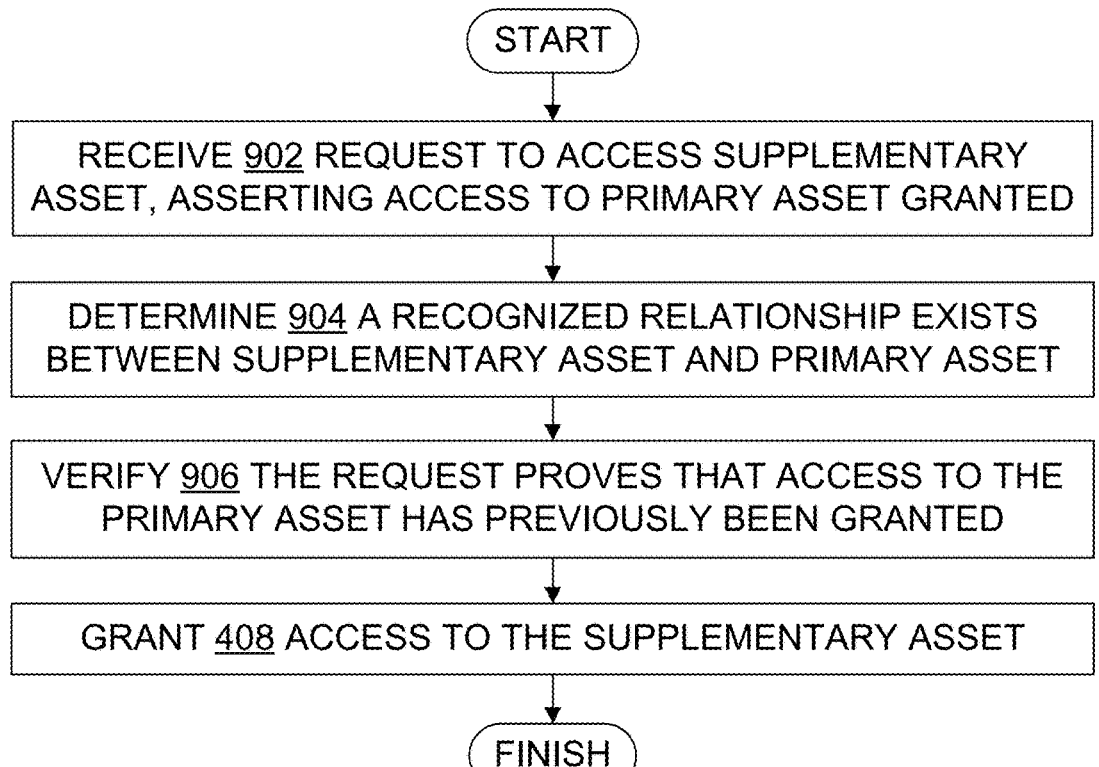
FIG. 9 is a flowchart illustrating steps in some access control methods.

FIG. 9 illustrates a method 900 which is an example of methods that may be performed or assisted by an enhanced system with an access controller 210. The access controller receives 902 a request for access to a supplementary asset, and then determines 904 that a suitable relationship exists between the supplementary asset and a primary asset. The primary asset may be identified explicitly or implicitly in the access request. In this example, the access controller also verifies 906 that the requestor has access to the primary asset, and therefore grants 408 access to the supplementary asset. Although not shown in FIG. 9, the request could have instead been denied 410, e.g., if no suitable relationship was determined to exist or if the supplied proof of access to the primary asset was deemed insufficient, or both.

Figure 20:
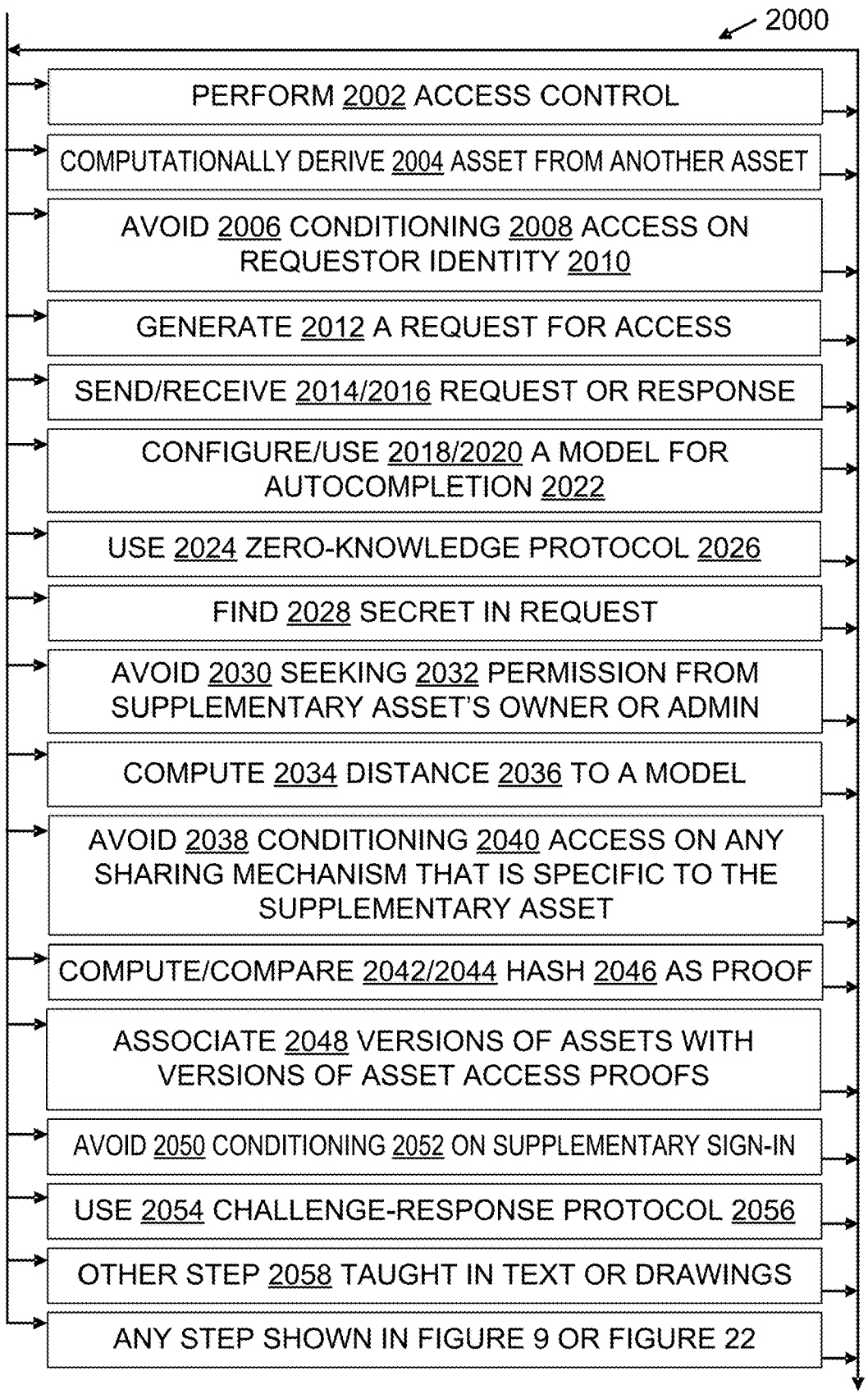
FIG. 20 is a flowchart further illustrating steps in some access control methods.

FIG. 20 further illustrates access control methods (which may also be referred to as "processes" in the legal sense of that word) that are suitable for use during operation of a system with an access controller 210, including some refinements, supplements, or contextual actions for steps shown in FIG. 9. FIG. 20 also incorporates steps shown in FIG. 22. Technical processes shown in the Figures or otherwise disclosed will be performed automatically, e.g., by a web service communicating with an integrated development environment extension, unless otherwise indicated. Processes may also be performed in part automatically and in part manually to the extent action by a human administrator or other human person is implicated, e.g., in some embodiments a person may specify which of several available versions of a supplementary asset the person wants to access. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 9 and 20. Steps may be performed serially, in a partially overlapping manner, or fully in parallel. In particular, the order in which flowchart 900 action items or flowchart 2000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method performed by or with an access controller to control access by a requestor to a supplementary asset, the method including: receiving 902 a request by the requestor for access to the supplementary asset; determining 904 that the supplementary asset is related to a primary asset; and verifying 906 whether the requestor has access to the primary asset. When a verification result of the verifying indicates the requestor has access to the primary asset, then the method includes granting 408 the requestor access to the supplementary asset based on a determination result of the determining and on the verification result, and when the verification result of the verifying does not indicate the requestor has access to the primary asset, then the method includes denying 410 the requestor access to the supplementary asset based on at least the verification result. In this example, the requestor is granted access to the supplementary asset or the requestor is denied access to the supplementary asset, without 2030 interactively seeking 2032 a supplementary asset access permission on behalf of the requestor from an administrator or an owner of the supplementary access. Similarly, access may be granted without 2006 conditioning 2008 access on the requestor's identity 2010, and without 2050 conditioning 2052 access on a supplementary sign-in, e.g., as opposed to burdening users with one sign-in to access code under development and another sign-in for access to large assets such as those managed using git LFS (large file storage).

In some embodiments, the determining 904 produces at least one of the following determination results 414, thereby representing a recognized relation 212 between the supplementary asset and the primary asset: at least a portion of one of the assets was computationally derived 2004 from at least a portion of the other asset (relation 702); each asset belongs to the same software artifact build project 516 (relation 704); one of the assets is repository-resident and the other asset includes a development tool 122 or artifact 310 that is applicable to at least a portion of the repository-resident asset (relation 706); one of the assets includes source code 504 resident in a version control system and the other asset includes a development tool 122 or artifact 310 that is applicable to at least a portion of the source code (relation 708); one of the assets includes a build dependency of the other asset or a runtime dependency of the other asset or both (relation 710); one of the assets includes data stored in a system configured for large file storage 716 and the other asset includes a text pointer or other reference to that data (relation 714); or one of the assets includes a machine learning model 510 which was trained at least in part using at least a portion of the other asset (relation 718).

In some circumstances, both assets 206 and 220 are versioned. For example, a system may have versioned models 220 for versioned source code 206. One may map 418 between a particular version of a supplementary asset and a particular version of the primary asset, e.g., by choosing a model that matches a particular commit point as discussed elsewhere herein. Thus, in some embodiments there are multiple versions of the supplementary asset and multiple versions of the primary asset, and the method includes mapping 418 between a particular version of the supplementary asset and a particular version of the primary asset.

Some embodiments reduce management requirements relative to certain other access sharing approaches. In some, the method grants the requestor access to the supplementary asset without 2038 conditioning 2040 that access on supplementary-asset-specific operations performed using a share link, a file share, or another explicit sharing management mechanism.

A hash 2046 may be used in some embodiments to prove access to the primary asset. In some embodiments, the verifying 906 includes comparing 2044 a hash previously stored by the access controller in correspondence with the supplementary asset to a hash supplied 2014 to the access controller through the request.

In some embodiments, there are multiple versions of the primary asset, and the method includes associating 2048 different versions of the primary asset with corresponding versions of a proof of access to the primary asset. For example, the proof may be stored as part of the primary asset itself, or as part of the primary asset's metadata, or as part of commitment metadata in a VCS 318.

Some embodiments reduce management requirements by granting the requestor access to the supplementary asset without 2050 conditioning 2052 that access on a supplementary sign-in that is specifically performed to gain access to the supplementary asset.

In some embodiments, the verifying 906 includes performing 2024 a zero-knowledge protocol 2026 to prove access to the primary asset. In some, the verifying 906 includes performing 2054 a challenge-response protocol 2056 to prove access to the primary asset.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as access requests 208, relationship checkers 214, relationship determinations 414, primary access proofs 404, primary access checkers 218, primary access verifications 416, and responses 406, in the form of data 118 and instructions 116, read from a removable storage medium 114 and/or another source such as a network connection, to form a configured storage medium. The configured storage medium 112 is capable of causing a computer system 102 to perform technical process steps for access to supplementary assets, as disclosed herein. The Figures thus help illustrate configured storage media embodiments and process (a.k.a. method) embodiments, as well as system and process embodiments. In particular, any of the process steps illustrated in FIG. 9 or 20, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 cause an access controller to perform a method which controls access by a requestor to a supplementary asset. This method includes receiving 902 a request by the requestor for access to the supplementary asset, determining 904 that the supplementary asset is related to a primary asset, and verifying 906 whether the requestor has access to the primary asset. When a verification result of the verifying 906 indicates the requestor has access to the primary asset, then the method grants 408 the requestor access to the supplementary asset based on a determination result of the determining and on the verification result. When the verification result of the verifying does not indicate the requestor has access to the primary asset, then the method denies 410 the requestor access to the supplementary asset based on at least the verification result. Thus, the requestor is granted access to the supplementary asset or the requestor is denied access to the supplementary asset, without interactively seeking 2032 a supplementary asset access permission on behalf of the requestor from an administrator or an owner of the supplementary access, and without requiring 2052 a supplementary sign-in that is specifically performed to gain access to the supplementary asset.

In some embodiments, the verification result indicates the requestor has access to the primary asset based on finding 2028 present in the request a secret 404 that is deemed available only to authorized users of the primary asset. The secret may be found, e.g., in a specified field of a request data structure. In some embodiments, the secret that is deemed available only to authorized users of the primary asset includes at least one of the following: a hash 2046 based on at least a portion of a repository commit history 1004 (e.g., listing commit points); at least a portion of a repository commit history 1004; a hash based on at least a portion of a source code 504 in the primary asset; at least a portion of a source code in the primary asset; a hash based on at least a portion of a repository metadata 1006; at least a portion of a repository metadata 1006; a hash based on at least a portion of a document in the primary asset; or at least a portion of a document in the primary asset. Commit histories, hashes, source code, repository metadata, schedules, and documents are each examples of artifacts 310.

In some embodiments, the supplementary asset includes a machine learning model which was trained at least in part using at least a portion of the primary asset, and the method further includes setting 2058 a model retraining schedule. In some, the method further includes setting 2058 a model deletion criterion whereby a model that is not deemed in active use will be automatically deleted.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, secrets or other proofs, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Figure 21:
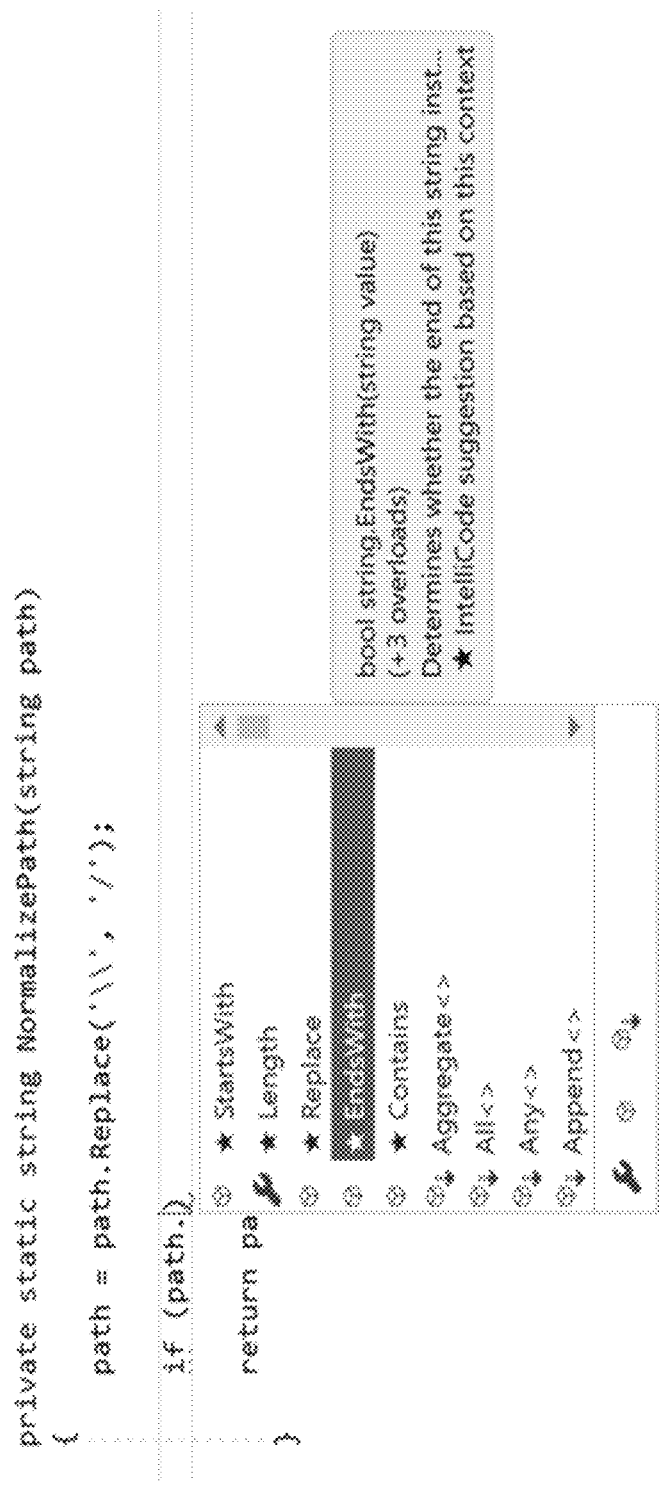
FIG. 21 is an example screen display showing an auto-completion tool suggestion.

IntelliCode™ models. IntelliCode™ functionality of various kinds is available or could be made available as an extension to Visual Studio® and VSCode™ tools, allowing developers to be more productive by, e.g., suggesting IntelliSense® results based on the context where code is being written (marks of Microsoft Corporation; developers will acknowledge that "VSCode" refers to Visual Studio® Code technology and solutions). IntelliCode™ functionality will sort IntelliSense® results so that the most likely member to be called is shown first, with a star denoting an IntelliCode™ suggestion. An example is shown in FIG. 21. Of course, other user interfaces may also be used, as may other indications than a star.

IntelliCode™ functionality provides these completion opportunities using a model file that contains information used to provide context-sensitive suggestions. These model files may be produced in different ways. A "common model" file for use in Visual Studio® and Visual Studio Code™ development environments is produced by Microsoft and is available to anyone interested. This model file contains only base classes (in the .NET case it contains .NET base class types and commonly used libraries such as Json.NET). The common model is trained with data 512 obtained by scraping thousands of open source repositories in GitHub. By contrast, a "custom model" file is produced by Microsoft at the request of a developer. This model file 510 is trained using a minimal set of data from a developer's code base, as extracted by the IntelliCode™ extension in the developer's instance of the Visual Studio® development environment. The extracted data is then sent to Microsoft to be used in generating the final model, as the actual model training is performed by Microsoft servers.

Although Microsoft technology is used in some motivating examples, the teachings herein are not limited to use in technology supplied or administered by Microsoft. Under a suitable license, for example, the present teachings could be embodied in software or services provided by any version control 318 provider or host, or in asset 206, 220 management systems that have relationships between dependent or otherwise related 212 assets, or used by vendors who provide customized modelling solutions for code 506 or for other custom model training scenarios. In environments 100 having repositories 32, supplementary asset access control functionality taught herein may allow a client to consume custom model files 510, 220 simply by proving 404 that the client 200 has access to the code repository 320, 206 from which the models were derived 2004.

In this discussion and elsewhere in the present disclosure, "enhanced" refers to IntelliCode™ or other technology which is enhanced to have or support supplementary asset access control functionality taught herein.

Repository-attached custom autocompletion models. Although the supplementary access control teachings provided herein have wide applicability, additional insight into them may be gained by some readers through discussion of examples involving circumstances which initially motivated aspects of those teachings. In particular, some motivating examples involve repository-attached IntelliCode™ custom models (mark of Microsoft Corporation). In terms of the present disclosure, models 510 are examples of supplementary assets 220, although they did not have that role per se prior to creation of the supplementary asset access control innovations taught herein. Models 510 are computationally derived 2004 from source codes 504, which are primary assets 206.

By default, an IntelliCode™ service will allow repository-attached models to be trained for the first time by anyone. Once a model is trained the IntelliCode™ services may only allow re-training once per specified period (e.g., every 24 hours or more), or impose other constraints to keep a low cost of operations. In some systems, on the client side a policy could be set, e.g., in a .intellicode file adjacent to the solution, to tell clients and continuous integration (CI) agents about training policies that might be more strict than the default server policies. Trainings could be limited to once per week, for example. Clients may query the IntelliCode™ services for model details, and they can determine whether a training is due or not; in some embodiments it is ultimately up to the service whether to allow re-trainings to occur.

In an enhanced system, when a model 510 is to be first created the IntelliCode™ client 200 will send a request to create a new repository-attached model. The request 208 to the service 618, 422, 210 will include a partial prefix of the HEAD commit hash, as well as a hash 2046 computed 2042 by traversing the entire git commit hash history 1004. IntelliCode™ functionality will train the new model and will store the partial prefix of the HEAD commit hash and the git commit history hash in a database 502. An identifier of the model 510 in the IntelliCode™ service will be the git upstream repo URL as reported by the original creator of the model 510. For example, in some implementations "https:// github dot com/Microsoft/vscode" would be an identifier for a VSCode™ repository on GitHub (this URL has been modified herein to make it inactive, by replacing "." by "dot"). Notice that this model will potentially include multiple solution inputs such as source from multiple build targets, combining all the source in the repository into a single model.

When a client wants to obtain 216 a repository-attached model for a solution in a repository, it will send 2014 a request 208 to the IntelliCode™ service 210, providing the expected identifier for it (the git upstream repo URL). The service will respond 406, 2054 back with a challenge that includes the partial prefix of the HEAD commit hash that was provided when the model was trained. The client will then have to traverse its git commit history 1004, starting in the commit 312 that matches the partial prefix and going backwards all the way to the initial commit, and provide 2014 a hash of this history to the IntelliCode™ service 210 as the client's proof-of-access 404. The service will compare 2044 this value to the one it has stored and if they match then it will provide 408 the client with a shared access signatures (SAS) token to a blob (binary large object) 310 holding the custom model. Although a token 808 is also used in familiar systems that do not utilize access controllers 210, in some embodiments taught herein the access controller 210 provides the access token without the enhanced system first requiring a separate sign-in, an interactive permission grant, or a similarly burdensome access management specifically for access to the model.

In some implementations, a requestor can only provide a proof-of-access if the requestor has a full copy of the repository, because otherwise the requisite data is not available to generate the hash which serves as the proof. If a requestor has proved it has access to the repository, then the requestor has full access to the code. Giving the requestor access to the model doesn't extend the requestor's knowledge of the code, as the requestor could have instructed the system to make a personal custom model trained on the same code.

In some implementations, it is possible to not exchange the proof-of-access hash directly but instead provide a zero-knowledge proof. This is an option. Usage of zero-knowledge proofs may be omitted, e.g., when communications are encrypted and assumed to be secure.

In some implementations, models that aren't re-trained in a specified period (e.g., 30 days) will be automatically deleted, assuring customers that the model generation service provider won't keep customer data beyond the specified period.

In some implementations, a solution's .intellicode file can inform a CI agent about how regularly to submit repository-attached models for training; it doesn't have to happen on every build. Some implementations provide an ability to train repository-attached models more regularly than the server's policies allow. Some implementations focus on models that are not intended for public consumption. Some are confined to repository-attached models. By their nature, these custom models shouldn't be sharable, nor should they be accessible by any means other than proof-of-access or another secure mechanism.

Enhanced functionality for automatically granting access to an IntelliCode™ or other model 510, 220 via proof of access 216 to a related 212 source 504 repository 320, 220 may be viewed as having two parts, at least in some implementations.

Part 1 involves creation of the repository-attached model for git repositories. When a user generates a repository-attached custom model, the enhanced IDE extension will proceed with symbol extraction much as it would for a familiar custom model. However, when communicating with the enhanced modeling services, the enhanced extension will send some additional information: (a) the repository's remote origin value, as indicated by git; (b) the first 12 characters (for instance) of the commit at the tip of HEAD, as reported by git; and (c) a secret derived from the git repository's metadata. This secret is a value calculated based on the properties of the repository, and has the following properties: it is stable in that any client would get to the same result for the repository in question at that time, and it is easy to calculate if and only if one has full access to the git repository's full history. The enhanced services will store this additional information securely as part of the model metadata in a models database. Other than that additional information being stored, the model training process follows a familiar process used for custom models.

Part 2 involves consumption of the repository-attached model for git repositories. The enhanced extension for an IDE 304 will provide an option for developers to permit searching for and using repository-attached models 510. When this feature is turned on, enhanced autocompletion technology will detect when a solution is open and will ask whether the solution lives in a git repository.

If it does, the enhanced autocompletion technology will communicate with git to obtain the repository's remote origin value. The enhanced extension will then send 2014 a request 208 to the enhanced services for a model for this repository identifier. If such a model exists, the server will send a challenge with the first 12 characters of the commit identifier (e.g., a SHA hash) that was the tip at the time of model training. The enhanced extension will receive the challenge and will traverse the git repository commit history until it finds the commit that matches the partial commit SHA. With access to the commit metadata and the repository history, the client will calculate the secret associated to that commit. This is the secret 404 that will be sent to the server 210; it can only be calculated if the client 200 has access to the repository 320, 206.

Figure 22:
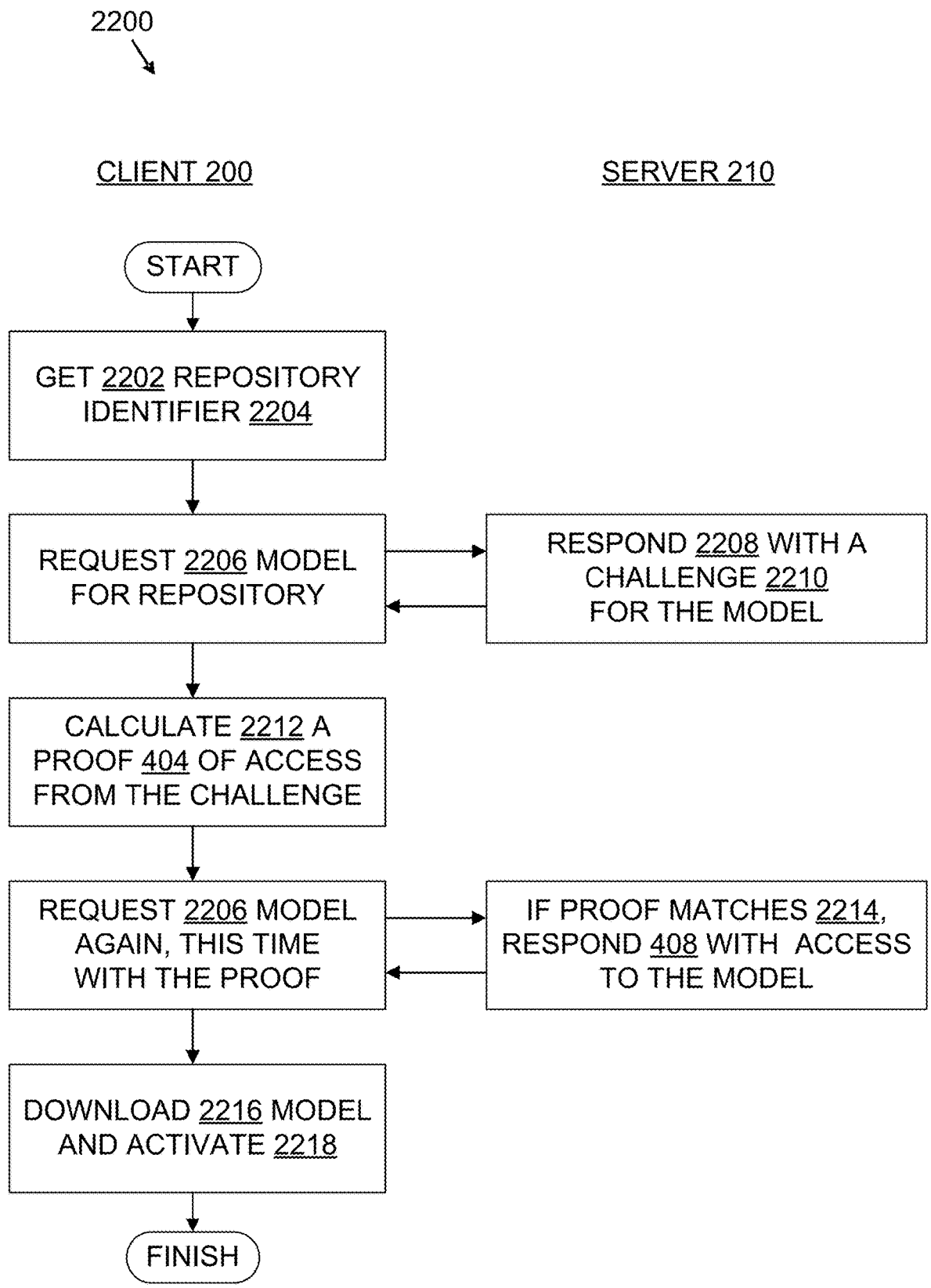
FIG. 22 is a flow diagram illustrating acquisition of a repository-attached model.

The enhanced extension will then repeat the search call 2206 to the enhanced service, but this time it will include the challenge identifier as well as the derived secret. The enhanced service will receive this secret and compare 2044 it with the securely stored secret in the database. A match 2214 will give the caller 200 access 216 to the model 510, 220, and the server will respond with all the required information for the enhanced extension to make use of this model. FIG. 22 shows a diagram with a model acquisition flow for repository-attached models.

Figure 10:
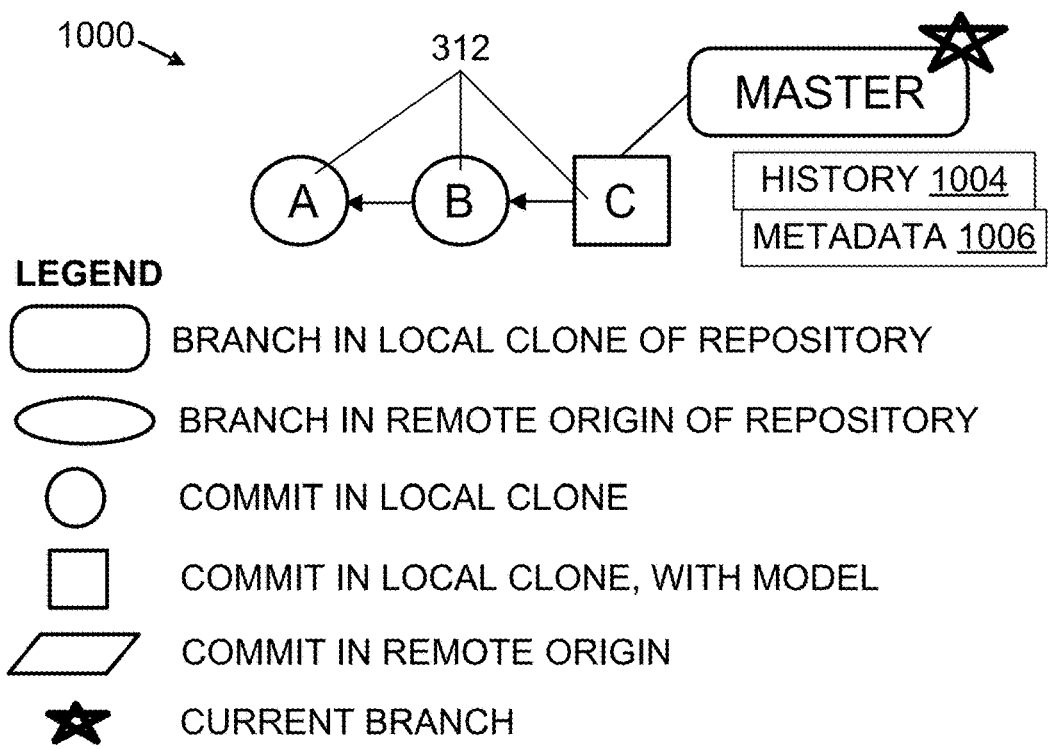
FIG. 10 is a repository commit diagram illustrating repository branches and commit points, including a legend which helps define symbols used in the diagram.

Training model from the master branch. A "master branch" in a repository is considered the main trunk of the source version history tree, at least in environments which use git repository terminology. A "feature branch" is a branch that can trace its origin to a node in the master branch but is separate from the master branch. As illustrated in FIG. 10 and by the additional examples in FIGS. 11-19, a "master" is a branch in the local clone of a repository, an "origin master" is a branch in the remote origin of a repository, commits 312 may occur in a local clone of a repository with or without a model attached, and commits 312 may also occur in the remote origin of a repository.

Multiple versions of source code 504 can result in multiple versions of an autocompletion model 510, or multiple versions of another related resource 220. Some embodiments implement teachings to decide which model is "closest" to the point of development in a branch outside the main trunk of the code's development history.

The following discussion explores aspects of training models from master branches as opposed to training them from feature branches. Assume one has a master branch with commits A, B, and C, and assume that a model (e.g., an IntelliCode™ or other autocompletion model) is trained at commit C (indicated in FIG. 10 by the square shape), using a command sequence such as:
git commit -m A
git commit -m B
git commit -m C
train intellicode model The star in FIG. 10 denotes the branch one is currently operating on.

Although git commands are used in examples herein, the teachings provided may also be implemented using other repository technologies.

Figure 11:
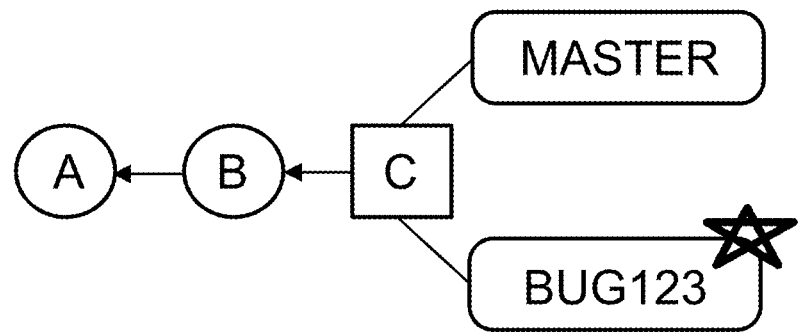
FIGS. 11 through 19 are additional repository commit diagrams, using symbols defined in the FIG. 10 legend.

Now, assume one creates a new branch to fix a bug labeled "bug123". This branch is initially pointing to commit C, as shown in FIG. 11 and consistent with this command:

git checkout -b bug123

Figure 12:
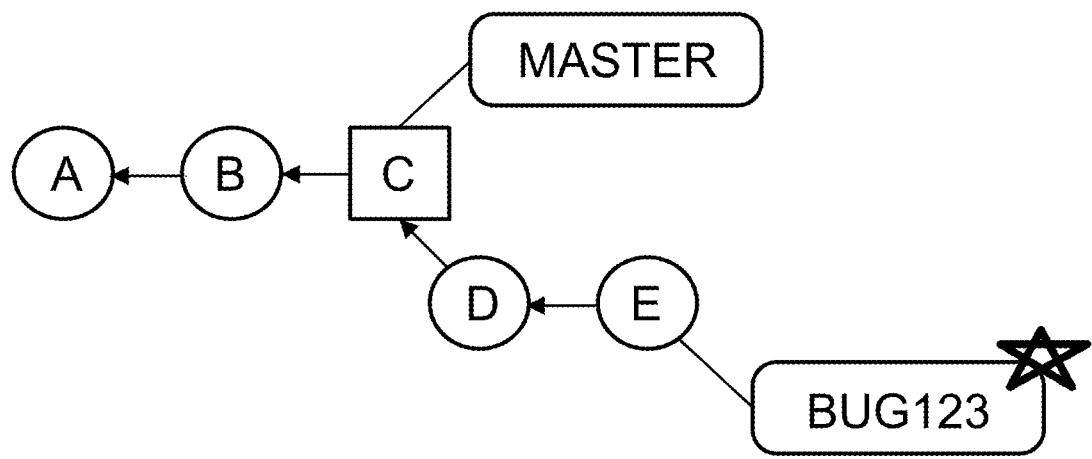

Now, assume branch bug123 moves forward with its own commits, D and E, as shown in FIG. 12. Note that a developer using this branch is still using the model that was trained in commit C; that commit 312 is accessible in the git history from branch bug123. FIG. 12 reflects these commands:

git commit -m D
git commit -m E

Figure 13:
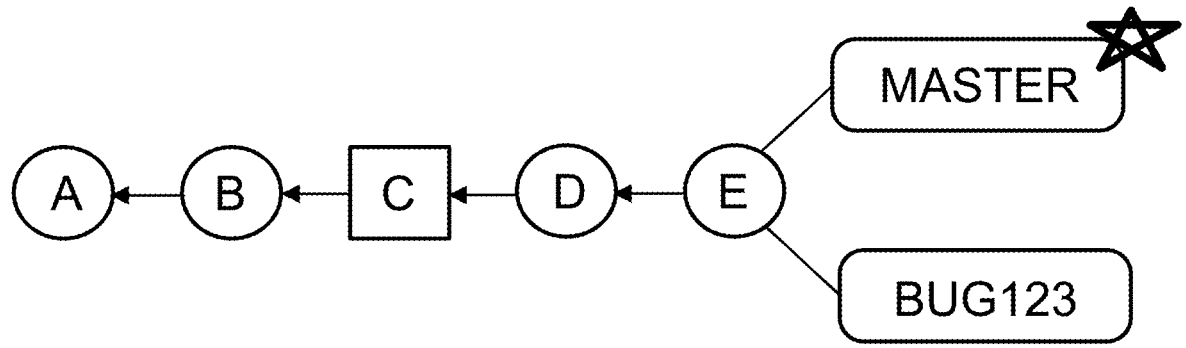

Assume the change is then merged, and master has the new changes, as shown in FIG. 13 and per the following commands:

git checkout master
git merge bug123

Figure 14:
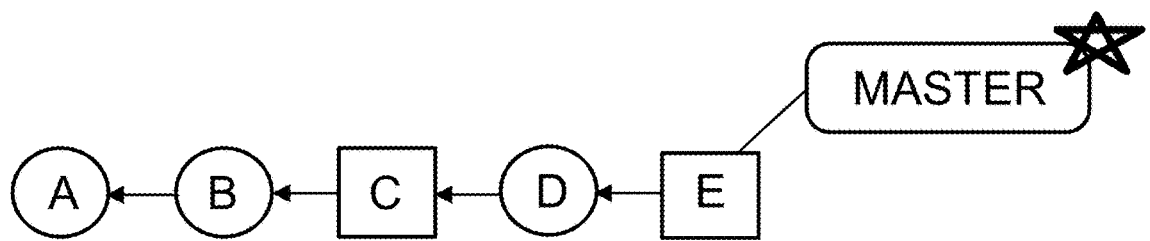

Next in this example, a new model training occurs after branch bug123 is merged into master. This new training will be off commit E, as shown in FIG. 14 and per the following commands:

git checkout master
git branch -D bug123//in an alternate scenario, this line is omitted
train intellicode model At this point, developers who pull from origin master should see that there are two model versions for this repo, one for commit C and one for commit E. They can use the one closest to the point in time where they are in the code, but time elapsed is not the only way to measure distance to a model. More details on computing the "closest" model are discussed below.

Figure 15:
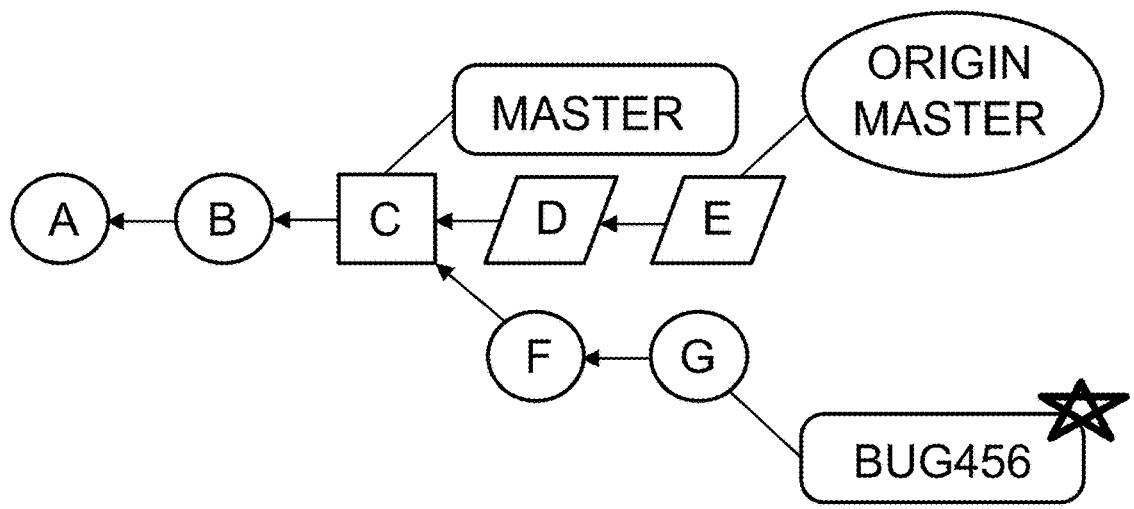

Now, assume a different developer, called Dev2, has created branch bug456 at the same time as branch bug123 was created, and Dev2 is still working out of their branch even though the changes introduced from branch bug123 have already been merged to the remote origin. This is illustrated in FIG. 15, in which the trapezoidal nodes D and E are remote and aren't visible from the local repository of the developer Dev2. Developer Dev2 only has access to the model that was created at commit C; as Dev2 hasn't fetched or pulled from the remote origin yet, Dev2 cannot produce a proof of access for the new model at commit E. Dev2 can produce a proof of access for the model at commit C because commit C is in Dev2's local git repo copy. This situation is consistent with the commands:

git checkout -b bug456
git commit -m F
git commit -m G

Figure 16:
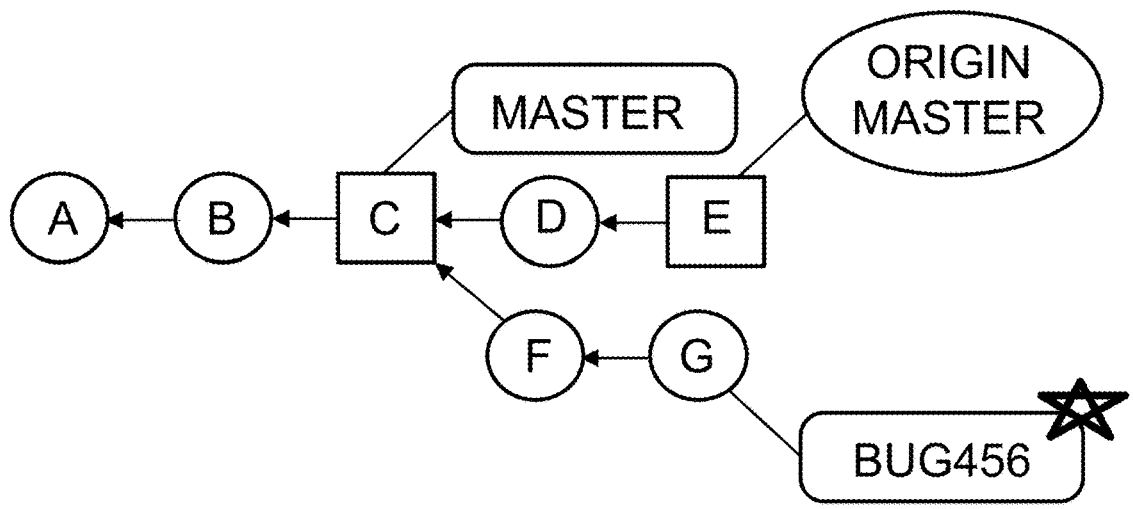

In this example, Dev2 then fetches the changes from the remote, as shown in FIG. 16 and per the following command:

git fetch

Figure 17:
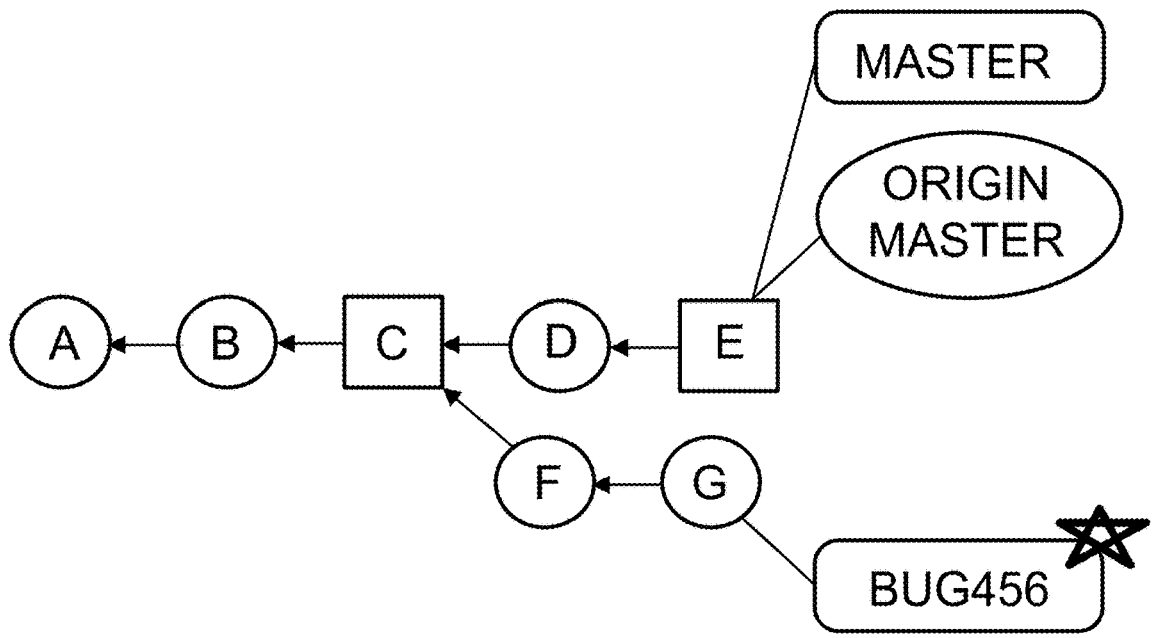

At this point Dev2 has updated the local git database and would be able to obtain the model created for commit E given that Dev2's local git history now includes commit E and model requesting code 204 operating on behalf of Dev2 can compute a proof of access using that local git history. An alternative to fetching would be pulling, which will have the same effect, as illustrated in FIG. 17 and consistent with these commands:

git checkout master
git pull
git checkout bug456

Now consider the option of creating models for commits that aren't in master. The only way developers would be able to consume such models would be if the developers worked directly in the branch that was used to produce the model, or a sub-branch of it. Given that every repository has a master (or master-equivalent) branch from which all other branches derive, using the master to produce models maximizes the likelihood of there being external consumers that can obtain said models via a proof of access.

Closest model. This discussion now returns to the topic of obtaining the closest model to a specified feature branch. When a client requests a repository-based model, the enhanced services will provide the requestor with a challenge that includes a list of model versions that are known. So, in the example above, the requestor will get a challenge that reads something like <Challenge: "g2/C g2/E">. This means that the server contains or can give access to a model for this repository with two different versions, one for the commit C and another one for the commit E. The enhanced service is also signaling which algorithm is used to obtain the proof of access, in this example that algorithm is called "g2".

Figure 18:
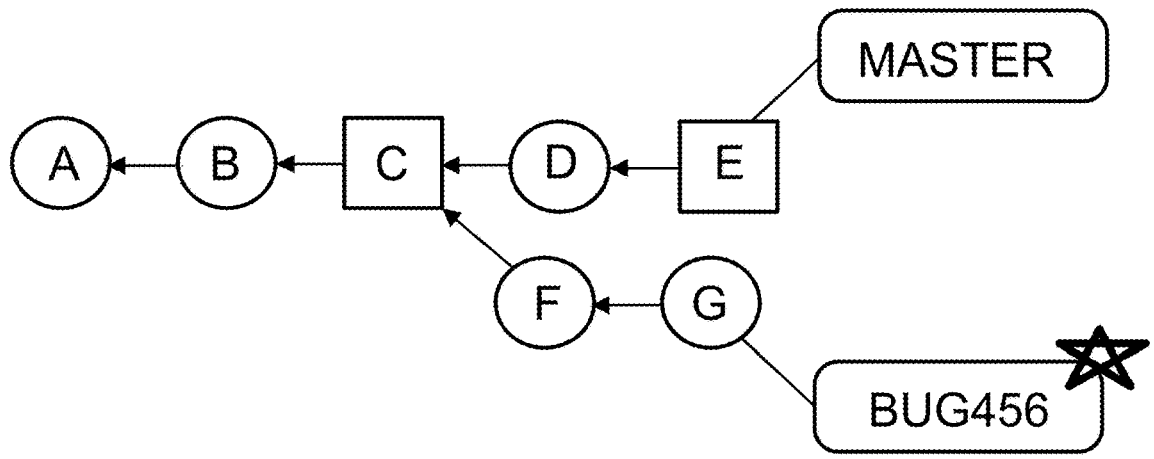

The client may decide which version of the model it wants to obtain. Assume the client is working in commit G of branch bug456, as illustrated in FIG. 18. A question posed is whether the client wants to obtain the model at commit E or the model at commit C. One may accordingly ask which model will be more applicable to the requesting client's code while the client 200 is working over commit G in branch bug456. One algorithm to decide this question is to count the number of commits that separate the one the client is working (G) at from the commits that have models associated with it (C, E). In the FIG. 18 example situation, the distance from G to C measured by node traversals is 2 commits (shortest traversal would be G->F->C), whereas the node traversal distance from G to E is 4 commits (G->F->C->D->E). So in this example, the client (or the service 210 acting automatically on behalf of the client) will choose to obtain (or provide access to) the model at commit C instead of the model at commit E, even though E is newer. Node traversals may also be referred to as node hops or node links.

Figure 19:
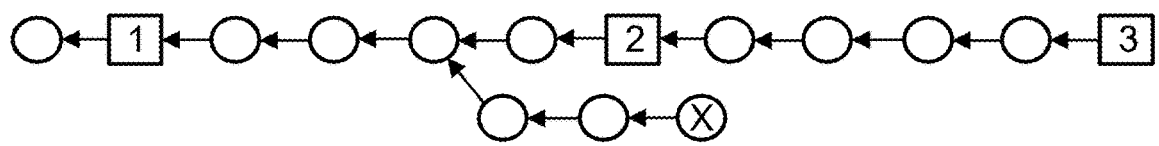

FIG. 19 illustrates another scenario. Assume a requestor is working in a feature branch, and currently working in commit X at the end of that branch. The node traversal distances are thus 6 hops from node X to node 1, 5 hops from node X to node 2, and 10 hops from node X to node 3.

In this case an enhanced system may favor obtaining or providing (depending on one's viewpoint) a model version that is attached to commit 2 rather than model versions for commits 1 or 3.

Once the enhanced system has determined which version of the model to obtain or provide, the enhanced requestor will compute the proof of access for that specific commit. It will use the algorithm that the enhanced server specified ("g2" in this example) to compute the required proof of access. Once the proof is computed, the enhanced client will make a request to obtain the model, providing the proof of access for the version at commit 2, which will result in the enhanced server granting access to the model and providing the client with tokens or other credentials and information to obtain or access the associated model file.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 302 or elsewhere, and thereby provide access control 2002 enhancements that reduce security risks and management burdens when a user 104, 200 with access 216 to a primary digital asset 206 seeks access 216 to a related 212 supplementary asset 220. When a sufficient proof 404 of access to the primary asset is provided 2014, 2214, and the relationship 212 of the primary and supplementary assets is recognized 904, access to the supplementary asset is granted 408 without 2050 requiring 2052 a separate sign-in, without 2030 relying on a permission query 2032 to the supplementary asset's owner, and without 2006 using 2008 an authorization through an authenticated identity 2010 of the requestor 200, for example. Automatic access to the supplementary asset can be granted 408 without the security risks inherent in a file share 806 or a share link 804. In particular, a developer 104, 200 with access to one component 514 of a project 516 can be automatically and conveniently granted 408 access to the rest of the project 516. Likewise, a custom machine learning model 510 for autocompletion 2022 becomes accessible to all developers working on the repository 320 source code 504 that was used to train 2018 the model 510.

The presence of access control technology taught herein may be inferred in some cases from evidence of a user getting authorization to access an asset without having to sign in to any service specific to that access or that asset. One could inspect the network traffic leaving a device to see whether it was performing a proof of access challenge-response handshake. Source code inspection may not always be needed. The innovation may well be referenced in user documentation, e.g., to highlight about the ease of configuration for end users—they don't have to sign in to a service but instead get automatic access to related assets without having to take any specific actions beyond those needed to access the primary asset.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the enhanced system may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9, 20, and 22 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An access control system comprising an access controller, the access controller comprising:
   an access control memory;
   an access control processor in operable communication with the access control memory, the access control processor configured to perform access control steps which include (a) receiving a request by a requestor for access to a supplementary asset which is associated to a user account of a user who is not the requestor, (b) determining that the supplementary asset is related to a primary asset, (c) verifying that the request identifies or contains a proof of access to the primary asset, and (d) granting the access request based on a determination result of the determining step and on a verification result of the verifying step even though the supplementary asset was not associated to an account of the requestor, wherein the determining produces at least one of the following determination results, thereby representing a recognized relationship between the supplementary asset and the primary asset: at least a portion of one of the assets was computationally derived from at least a portion of the other asset, each asset belongs to the same software artifact build project, one of the assets is repository-resident and the other asset includes a development tool or artifact that is applicable to at least a portion of the repository-resident asset, one of the assets includes a build dependency of the other asset or a runtime dependency of the other asset or both, one of the assets includes data stored in a system configured for large file storage and the other asset includes a text pointer or other reference to that data; or one of the assets includes a machine learning model which was trained at least in part using at least a portion of the other asset;
   whereby the system provides an increase in available access to the supplementary asset without conditioning the increase in available access to the supplementary asset on any identity of the requestor.

2. The system of claim 1, wherein the primary asset includes source code, and the supplementary asset includes at least one of the following:
   an artifact which was computationally derived at least in part from the source code; or
   a build component of a project in which the source code is also a build component.

3. The system of claim 1, further characterized in at least one of the following ways:
   the system comprises a requestor device having a requestor device memory and a requestor device processor, and the requestor device is configured to generate within an integrated development environment the request for access to the supplementary asset;
   the system comprises an access controller web service interface, and the access controller receives the request through the access controller web service interface.

4. The system of claim 1, wherein the primary asset includes source code, the supplementary asset includes a model computationally derived at least in part from the source code, and the model is configured for use by an autocompletion tool.

5. The system of claim 1, wherein the primary asset includes source code in a version control system, the source code including source code versions at a plurality of commit points within the version control system, and wherein the supplementary asset includes an artifact that was computationally derived at least in part from the source code version at a commit point.

6. The system of claim 1, wherein the assets reside in different respective regions for at least one of the following definitions of a region: a local area network, a physical server, a computer, a data center, a trust domain, a web site, a web service, a repository, a machine learning model, a geographic city, a geographic county, a geographic state, or a geographic province.

7. A method used by an access controller to control access by a requestor to a supplementary asset which is associated to a user account of a user who is not the requestor, the method comprising:
- receiving a request by the requestor for access to the supplementary asset;
- determining that the supplementary asset is related to a primary asset, wherein the determining produces at least one of the following determination results, thereby representing a recognized relationship between the supplementary asset and the primary asset: each asset belongs to the same software artifact build project, one of the assets is repository-resident and the other asset includes a development tool or artifact that is applicable to at least a portion of the repository-resident asset, one of the assets includes a build dependency of the other asset or a runtime dependency of the other asset or both, one of the assets includes data stored in a system configured for large file storage and the other asset includes a text pointer or other reference to that data; or one of the assets includes a machine learning model which was trained at least in part using at least a portion of the other asset;
- verifying whether the requestor has access to the primary asset; and
- when a verification result of the verifying indicates the requestor has access to the primary asset, then granting the requestor access to the supplementary asset based on a determination result of the determining and on the verification result; and
- when the verification result of the verifying does not indicate the requestor has access to the primary asset, then denying the requestor access to the supplementary asset based on at least the verification result;
- whereby the requestor is granted access to the supplementary asset or the requestor is denied access to the supplementary asset, even though the supplementary asset was not associated to an account of the requestor, without interactively seeking a supplementary asset access permission on behalf of the requestor from an administrator or an owner of the supplementary access.

8. The method of claim 7, wherein the determining produces at least one of the following determination results, thereby representing a recognized relationship between the supplementary asset and the primary asset:
- at least a portion of one of the assets was computationally derived from at least a portion of the other asset; or
- one of the assets includes source code resident in a version control system and the other asset includes a development tool or artifact that is applicable to at least a portion of the source code.

9. The method of claim 7, wherein there are multiple versions of the supplementary asset and multiple versions of the primary asset, and wherein the method further comprises mapping between a particular version of the supplementary asset and a particular version of the primary asset.

10. The method of claim 7, wherein the method grants the requestor access to the supplementary asset without conditioning that access on supplementary-asset-specific operations performed using a share link, a file share, or another explicit sharing management mechanism.

11. The method of claim 7, wherein the verifying comprises comparing a hash previously stored by the access controller in correspondence with the supplementary asset to a hash supplied to the access controller through the request.

12. The method of claim 7, wherein there are multiple versions of the primary asset, and wherein the method further comprises associating different versions of the primary asset with corresponding versions of a proof of access to the primary asset.

13. The method of claim 7, wherein the method grants the requestor access to the supplementary asset without conditioning that access on a supplementary sign-in that is specifically performed to gain access to the supplementary asset.

14. The method of claim 7, wherein the verifying comprises performing a zero-knowledge protocol to prove access to the primary asset.

15. The method of claim 7, wherein the verifying comprises performing a challenge-response protocol to prove access to the primary asset.

16. A computer-readable storage medium configured with data and instructions which upon execution by a processor cause an access controller to perform a method which controls access by a requestor to a supplementary asset which is associated to a user account of a user who is not the requestor, the method comprising:
- receiving a request by the requestor for access to the supplementary asset;
- determining that the supplementary asset is related to a primary asset, wherein the determining produces at least one of the following determination results, thereby representing a recognized relationship between the supplementary asset and the primary asset: each asset belongs to the same software artifact build project, one of the assets is repository-resident and the other asset includes a development tool or artifact that is applicable to at least a portion of the repository-resident asset, one of the assets includes a build dependency of the other asset or a runtime dependency of the other asset or both, one of the assets includes data stored in a system configured for large file storage and the other asset includes a text pointer or other reference to that data; or one of the assets includes a machine learning model which was trained at least in part using at least a portion of the other asset;
- verifying, based on a proof of access or a lack of proof of access, whether the requestor has access to the primary asset; and
- when a verification result of the verifying indicates the requestor has access to the primary asset, then granting the requestor access to the supplementary asset based on a determination result of the determining and on the verification result; and
- when the verification result of the verifying does not indicate the requestor has access to the primary asset, then denying the requestor access to the supplementary asset based on at least the verification result;
- whereby the requestor is granted access to the supplementary asset or the requestor is denied access to the supplementary asset, even though the supplementary asset was not associated to an account of the requestor, without interactively seeking a supplementary asset access permission on behalf of the requestor from an administrator or an owner of the supplementary access, and without requiring a supplementary sign-in that is specifically performed to gain access to the supplementary asset.

17. The computer-readable storage medium of claim 16, wherein the verification result indicates the requestor has access to the primary asset based on finding present a secret that is deemed available only to authorized users of the primary asset.

18. The computer-readable storage medium of claim 17, wherein the secret that is deemed available only to authorized users of the primary asset includes at least one of the following:
- a hash based on at least a portion of a repository commit history;
- at least a portion of a repository commit history;
- a hash based on at least a portion of a source code in the primary asset;
- at least a portion of a source code in the primary asset;
- a hash based on at least a portion of a repository metadata;
- at least a portion of a repository metadata;
- a hash based on at least a portion of a document in the primary asset; or
- at least a portion of a document in the primary asset.

19. The computer-readable storage medium of claim 16, wherein the supplementary asset includes a machine learning model which was trained at least in part using at least a portion of the primary asset, and the method further comprises setting a model retraining schedule.

20. The computer-readable storage medium of claim 16, wherein the supplementary asset includes a machine learning model which was trained at least in part using at least a portion of the primary asset, and the method further comprises setting a model deletion criterion whereby a model that is not deemed in active use will be automatically deleted.

* * * * *